(12) United States Patent
Watanabe et al.

(10) Patent No.: US 7,756,474 B2
(45) Date of Patent: Jul. 13, 2010

(54) COMMUNICATION DEVICE, AND METHOD AND COMPUTER PROGRAM FOR INFORMATION PROCESSING THEREOF

(75) Inventors: Hideaki Watanabe, Kawasaki (JP); Naoyuki Inoue, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 856 days.

(21) Appl. No.: 10/694,989

(22) Filed: Oct. 29, 2003

(65) Prior Publication Data

US 2004/0157589 A1   Aug. 12, 2004

(30) Foreign Application Priority Data

Oct. 29, 2002   (JP)   ............................ 2002-314650

(51) Int. Cl.
*H04B 7/00* (2006.01)

(52) U.S. Cl. ...................... 455/41.2; 455/566; 455/564; 455/550.1; 370/328; 370/338

(58) Field of Classification Search ................ 455/41.2, 455/41.3, 566, 564, 550, 550.1, 556.1; 370/328, 370/338
See application file for complete search history.

(56) References Cited

U.S. PATENT DOCUMENTS

| | | | |
|---|---|---|---|
| 6,377,161 B1 | 4/2002 | Gromelski et al. | |
| 6,748,195 B1* | 6/2004 | Phillips | ...................... 455/41.2 |
| 7,089,298 B2* | 8/2006 | Nyman et al. | ................ 709/220 |
| 7,102,640 B1* | 9/2006 | Aholainen et al. | ........... 345/440 |
| 2002/0002035 A1 | 1/2002 | Sim et al. | |
| 2002/0039915 A1* | 4/2002 | Hama et al. | .................. 455/566 |

(Continued)

FOREIGN PATENT DOCUMENTS

EP   1024674   8/2000

(Continued)

OTHER PUBLICATIONS

European Search Report dated Sep. 1, 2006 in corresponding European patent application No. 03256828.9.

(Continued)

*Primary Examiner*—Tuan A Pham
(74) *Attorney, Agent, or Firm*—Staas & Halsey LLP

(57) ABSTRACT

A communication device relates a plurality of identification information to specifying information included in the identification information and manages them, and thereby enhances easiness of identifying and specifying of a device of the other party and usability of a connection with the device of the other party. The communication device has an identification information reception part (a radio transmission/reception part, a baseband part and a control part), a storage part (a data base part) and an information processing part (a control part). The identification information reception part receives the pieces of identification information concerning the device of the other party to be connected, and in the storage part the pieces of identification information which are received are stored. The information processing part stores the pieces of identification information, which are received, in the storage part, and retrieves the identification information from the storage part by receiving input of the specifying information out of the pieces of identification information, and relates a result of that retrieval to the specifying information and outputs them, or makes that output possible. By this, it is possible to use the pieces of identification information related to the specifying information for specifying of the device of the other party and connection with it.

13 Claims, 15 Drawing Sheets

U.S. PATENT DOCUMENTS

| | | |
|---|---|---|
| 2003/0037033 A1 | 2/2003 | Nyman et al. |
| 2003/0220765 A1* | 11/2003 | Overy et al. ................ 702/158 |
| 2004/0038712 A1 | 2/2004 | Ikegami et al. .............. 455/560 |
| 2004/0078372 A1* | 4/2004 | Huuskonen ................. 707/10 |
| 2004/0148404 A1 | 7/2004 | Muroya et al. |
| 2005/0088980 A1* | 4/2005 | Olkkonen et al. ........... 370/255 |

FOREIGN PATENT DOCUMENTS

| | | |
|---|---|---|
| JP | 7-336370 | 12/1995 |
| JP | 9-261227 | 10/1997 |
| JP | 11-122415 | 4/1999 |
| JP | 11-122416 | 4/1999 |
| JP | 2001-274875 | 10/2001 |
| JP | 2001-356984 | 12/2001 |
| JP | 2002-111860 | 12/2002 |
| WO | WO 02/87165 | 10/2002 |

OTHER PUBLICATIONS

Japanese Office Action, mailed Mar. 11, 2008 and issued in corresponding Japanese Patent Application No. 2002-314650.

U.S. Patent and Trademark Office Action mailed on Dec. 2, 2009 in child U.S. Appl. No. 11/687,687.

European Office Action mailed on Sep. 11, 2009 in corresponding European Patent Application No. 03 256 828.9 (6 pages).

U.S. Appl. No. 11/687,687, filed Mar. 19, 2007, Hideaki Watanabe, Fujitsu Limited Kawasaki, Japan.

Notification of Reason for Refusal issued Nov. 18, 2008 in Japanese Patent Application No. 2002-314650 (2 pages with 2 additional pages of English language translation).

U.S. Patent and Trademark Office Action mailed Jan. 8, 2009 in the related co-pending U.S. Appl. No. 11/687,687.

U.S. Office Action mailed Jul. 13, 2009, in child U.S. Appl. No. 11/687,687. (12 pages).

European Office Action issued Mar. 17, 2010 in corresponding European Patent Application No. 03 256 828.9 (3 pages).

* cited by examiner

F I G. 12
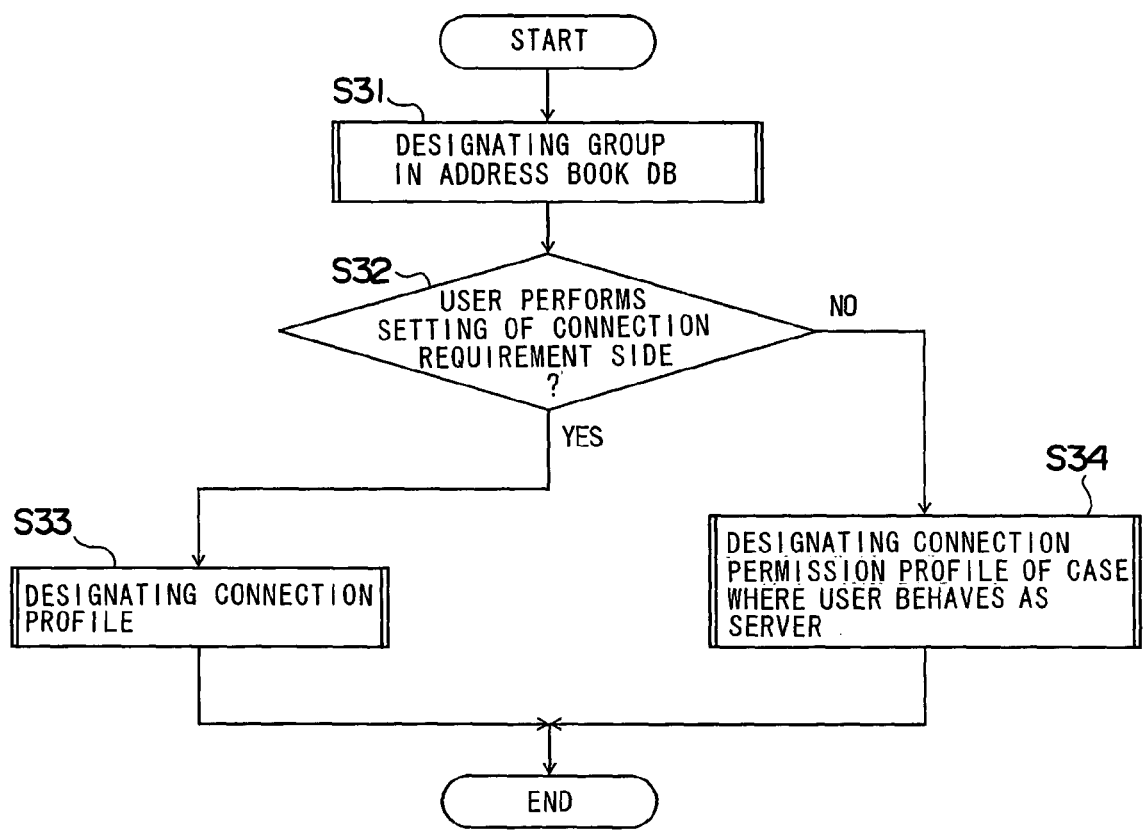

F I G. 14
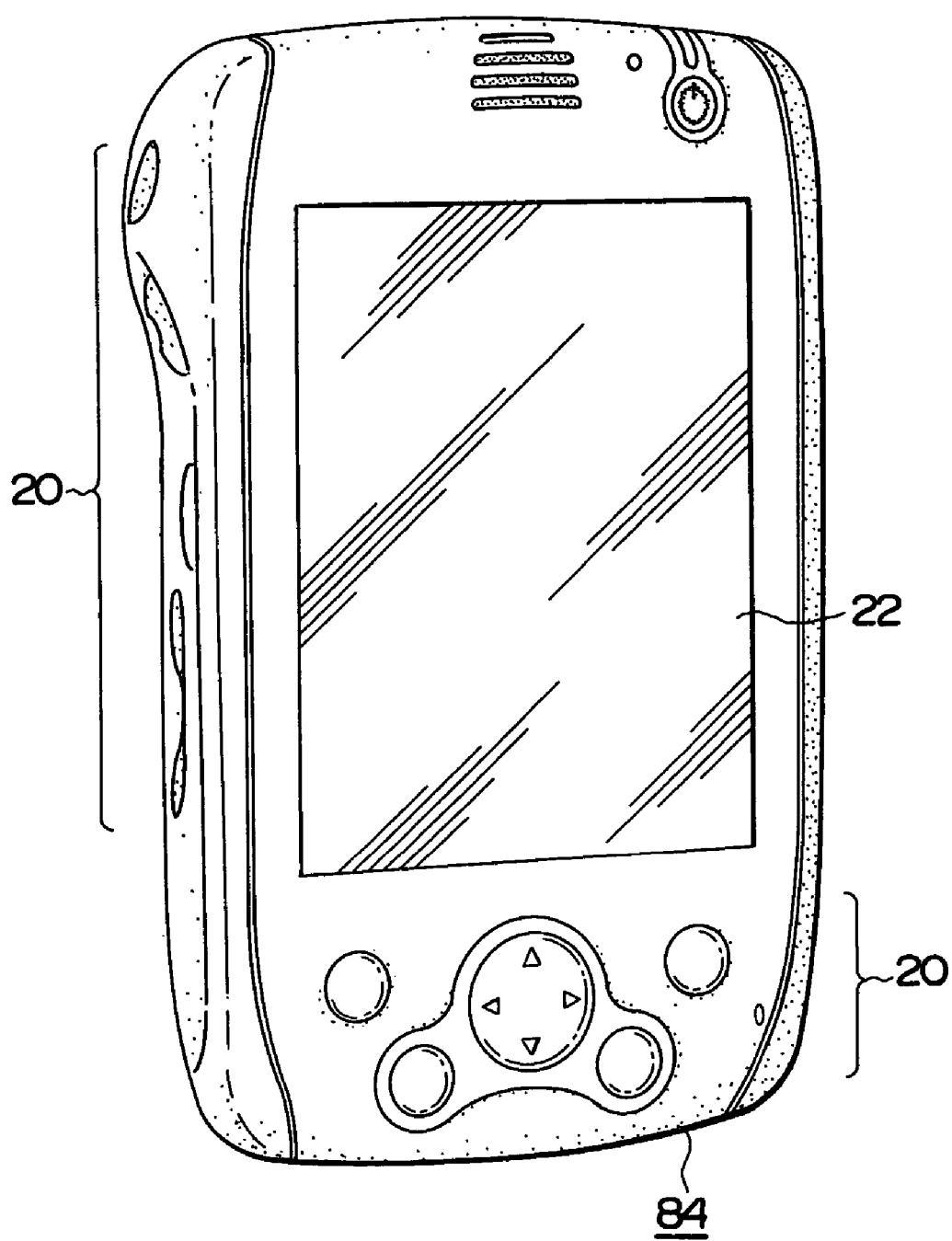

F I G. 15
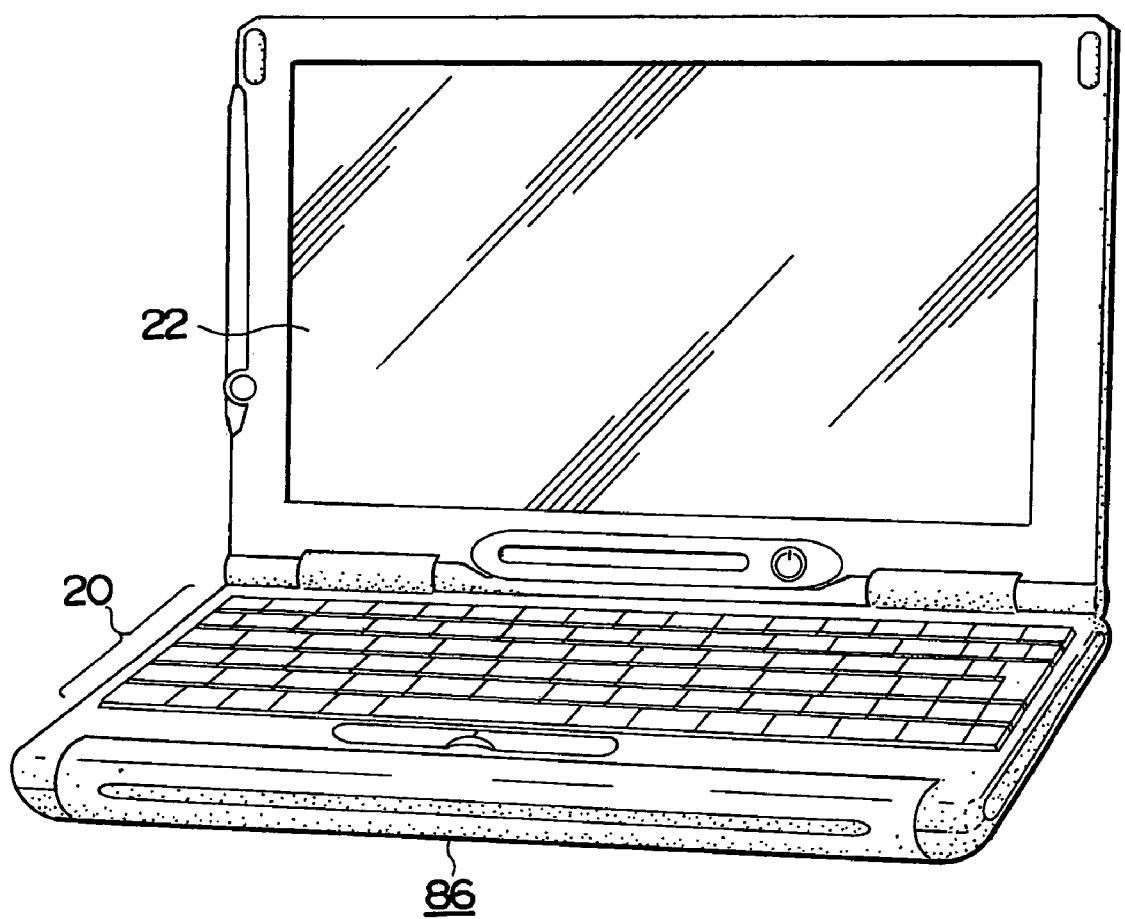

COMMUNICATION DEVICE, AND METHOD AND COMPUTER PROGRAM FOR INFORMATION PROCESSING THEREOF

BACKGROUND OF THE INVENTION

1. Field of the Invention

The present invention relates to a communication device suitable for short distance radio communication, which is mounted on an apparatus and a mobile terminal such as a mobile phone, PHS (Personal Handyphone System), PDA (Personal Digital Assistant) and a mobile PC (Mobile Personal Computer), and a method and a computer program for information processing of the communication device. In particular, it relates to a communication device which relates a plurality of pieces of identification information used in a connection with a device of the other party and manages them, and uses that identification information in connection information, and a method and a computer program for information processing thereof.

2. Description of the Related Art

Recently, in addition to a telephone function, a mobile terminal and so on, such as a mobile pone and PDA having a communication function, which are able to perform communication of information transmission, information exchange and so on in a short distance by radio, are being spread. A short distance communication function like this is utilized in communication of information transmission, information exchange and soon among various kinds of apparatuses, such as a remote control device, and is not limited to a mobile terminal of a mobile phone and so on.

Thereupon, in connection with a communication device utilizing this kind of short distance communication technology, the realization of communication technology which can facilitate a registration and a management of a plurality of pieces of identification information concerning a device of the other party and can improve a convenience of connection and information exchange is desired.

As a radio communication standard for a short distance, Bluetooth is in existence. This Bluetooth has standardized data exchange and a communication function in order to realize a data communication function by radio instead of a cable and the infrared rays as a transmission medium. This is a radio communication standard using a communication system which supports transmission/reception among a plurality of apparatuses, and uses the ISM band (Industry Science and Medical Band) in a working frequency band and the FH-SS (Frequency Hopping-Spread Spectrum) system in a modulation system.

A mobile terminal having Bluetooth can perform a synchronous data communication, synchronous voice communication of some channels and simultaneous communication of voice and data, and can also perform simultaneous communication between a parent apparatus and a plurality of child apparatuses in addition to transmission/reception by radio between two apparatuses of one to one. Further, the construction of a network is possible. Like this, the mobile terminal with Bluetooth has an excellent communication function.

By the way, as a patent document regarding this kind of communication technology, the Japanese Patent Laid Open Publication No. 2002-111860 is in existence, for example.

This patent document discloses technology that displays identification information obtained by way of radio communication on a display part so that a user of a mobile terminal can identify a terminal, with which the user desires to communicate, from a plurality of terminals existing within a radio range.

By the way, in case that a lot of terminals and/or apparatuses exist within a range able to perform radio communication like this, identification of a terminal or an apparatus with which a user desires to communicate and selection thereof are indispensable for information transmission and information exchange.

The technology described in the above patent document discloses that a terminal within a radio range, with which a user wants to communicate, can be identified from identification information received by communication. However, in case that a lot of terminals able to communicate exist within the radio range, since that terminal does not specify the other party with which it desires to communicate, there are cases in which a human confirmation, such as a relation between that terminal and an owner or a manager, is rendered necessary when a plurality of terminals come responding on the occasion of information transmission and/or information exchange, or when it is impossible to specify the other party of communication from the contents of identification information. In a case like this, this is troublesome.

SUMMARY OF THE INVENTION

Therefore, the present invention relates to a communication device by radio, and an object of the present invention is to make it easy to identify and specify a device of the other party by relating a plurality of pieces of identification information to specifying information included in the pieces of identification information and managing them.

Another object of the present invention is to improve the convenience of a connection with a device of the other party by relating a plurality of pieces of identification information to specifying information included in the pieces of identification information and managing them.

In order to attain the above objects, a communication device according to the present invention has an identification information reception part (a radio transmission/reception part 12, a baseband part 14 and a control part 16), a storage part (a data base part 18) and an information processing part (the control part 16). The identification information reception part receives a plurality of pieces of identification information concerning a device of the other party which is connected to the communication device, and, in the storage part, the pieces of identification information which are received are stored. The information processing part stores the received pieces of identification information in the storage part, retrieves the identification information from the storage part by receiving input of specifying information out of the pieces of identification information, and relates a result of that retrieval to the specifying information and outputs them, or makes that output possible.

The communication device, in order to specify the device of the other party, can use a plurality of pieces of identification information, for example, proper information representative of a communication device, human information such as an individual or a juridical person possessing that device, and so on. These pieces of identification information can be obtained by transmission and reception with the device of the other party by radio. However, the acquisition of the identification information is not limited to this. As a different manner except a device of the other party, the identification information may also be acquired by receiving a plurality of pieces of identification information, concerning a device of the other party, which is input from an input operation part. Thereupon, the storage part which stores these pieces of identification information is provided, and the information processing part stores the pieces of identification information, which are received, in the storage part. At this time, the pieces of identification information are stored so that the rest of the pieces of identification information except the specifying information is related to the specifying information out of the pieces of identification information. Here, "relating the specifying information out of the pieces of identification information to the rest of the pieces of identification information" is to link the specifying information to the identification information, for example, by means of a relation between the human information representative of an owner or a manager of a device of the other party and the proper information representative of that device of the other party.

Thereupon, with the information processing part, in case that the storage part is retrieved based on the input of the specifying information, if the pieces of identification information related to the specifying information are output, or if it is possible to output the pieces of identification information related to the specifying information, the identification information which can specify a device of the other party according to the specifying information can be recognized. Because of this, it is possible to identify and specify the device of the other party with ease. Further, when communicating with the device of the other party, it is possible to retrieve the identification information by receiving the input of specifying information and perform a connection with the device of the other party by using a result of that retrieval.

Therefore, according to the above communication device, the rest of the pieces of the identification information is related by the specifying information out of the pieces of identification information received from the device of the other party, and these are registered. And the pieces of identification information retrieved based on the input of the specifying information are output, or these are managed so as to be capable of outputting. Because of this, the device of the other party can be identified according to the specifying information, and can be easily and quickly specified by the identification information. By this, identifying and specifying the device of the other party become easy. When communicating with the device of the other party, the pieces of identification information are retrieved by receiving the input of the specifying information, and the connection with the device of the other party can be performed by using that retrieved result. Because of this, a convenience of the connection with the device of the other party may be improved.

Further, in order to attain the above objects, in the communication device of the present invention, the identification information can include human information and one or more pieces of proper information representative of a device of the other party, and can be constituted so that the specifying information to which the identification information is related is the human information. In the present invention, the human information is not limited to a direct name like a person's name and a company's name. The human information includes the abbreviation of a name, an animal's name, a nickname, and so on. According to a construction like this, a device of the other party can be identified in relation to the human information of a person's name and so on, and the device of the other party used for communication can be specified with ease.

Further, in order to attain the above objects, the communication device of the present invention can provide an information presenting part that relates a result of retrieval of the information processing part to the specifying information and presents them. That is, if a plurality of pieces of identification information related to the specifying information is presented to the information presenting part, specifying a device of the other party becomes easy since the device of the other party can be identified from the display of the information presenting part with ease. In addition, it is possible to perform a connection with the device of the other party by using the identification information under display. According to a construction like this, it is possible to show the pieces of identification information related by the specifying information in the information presenting part. Because of this, since a device of the other party is easily identified and specified from that presented contents, identifying and specifying the device of the other party become easy.

Further, in order to attain the above objects, the information processing method of the communication device of the present invention includes a receiving process of information, a storing process of information and an outputting process of information, and, particularly, includes the following processes.

(1) Receiving a plurality of pieces of identification information (a step 1).

(2) Recording the pieces of identification information (a step 2).

(3) Retrieving and outputting (a step 3).

That is, in the step 1, the pieces of identification information concerning a device of the other party are received, and the pieces of identification information are obtained from the device of the other party. In the step 2, the pieces of identification information which are received are stored in a storage part. In the step 3, a process which retrieves the identification information from the storage part by receiving input of specifying information out of the pieces of identification information is performed, and a result of retrieval which is obtained by that process is related to the specifying information and is output, or that output is enabled.

The identification information received by processing like this is used in identification and selection of the device of the other party, and in a connecting process besides. That is, a connection with the device of the other party is started by using the result of retrieval namely the identification information, or that start can be made possible.

According to the above information processing method of the communication device, based on the reception of the pieces of identification information concerning the device of the other party, the pieces of identification information are related to the specifying information included in that identification information and are arranged, and these are registered. Since the pieces of identification information are related to the specifying information and are output, or since it is possible to output them, these are used for the identification and selection of the device of the other party, and are further used in the connecting process. By this, a quick information process and so on become possible, and thereby a convenience may be enhanced.

Further, in order to attain the above objects, the information processing program of the communication device of the present invention is a program which makes the communication device perform the above-mentioned information processing method, and includes the following functions.

(1) Receiving a plurality of identification information (a function 1).

(2) Recording the pieces of identification information (a function 2).

(3) Retrieving and outputting (a function 3).

That is, in the function 1, the pieces of identification information concerning a device of the other party are received, and the pieces of identification information can be acquired from the device of the other party. In the function 2, the pieces of identification information which are received from the device of the other party can be stored in a storage part. In the function 3, a process which retrieves the identification information from the storage part by receiving input of specifying information out of the pieces of the identification information is performed, and a result of retrieval which is acquired by that process is related to the specifying information and is output, or that output is enabled. Hence, according to the information processing program mentioned above, the information processing method of the communication device according to the present invention is executed. By this, it is possible to easily identify and specify the device of the other party by using the identification information received through communication with the device of the other party, and it is possible to use that identification information in the connection with the device of the other party.

According to the above information processing program of the communication device, the information processing method of the communication device according to the present invention is executed. Thereby, it is possible to easily identify and specify the device of the other party by using the identification information received through the communication with the device of the other party, and that identification information is used in the connection with the device of the other party. Because of this, simple and quick information processing becomes possible, and usability of the communication device may be enhanced.

BRIEF DESCRIPTION OF THE DRAWINGS

The foregoing and other objects, features and attendant advantages of the present invention will be appreciated as the same become better understood by means of the following description and accompanying drawings wherein:

FIG. 12 is a flow diagram showing a communication process making it possible to permit or refuse a connection by a specific profile;

FIG. 14 is a perspective view showing PDA according to the embodiment; and

FIG. 15 is a perspective view showing a note type personal computer according to the embodiment.

DETAILED DESCRIPTION OF THE PREFERRED EMBODIMENTS

Figure 1:
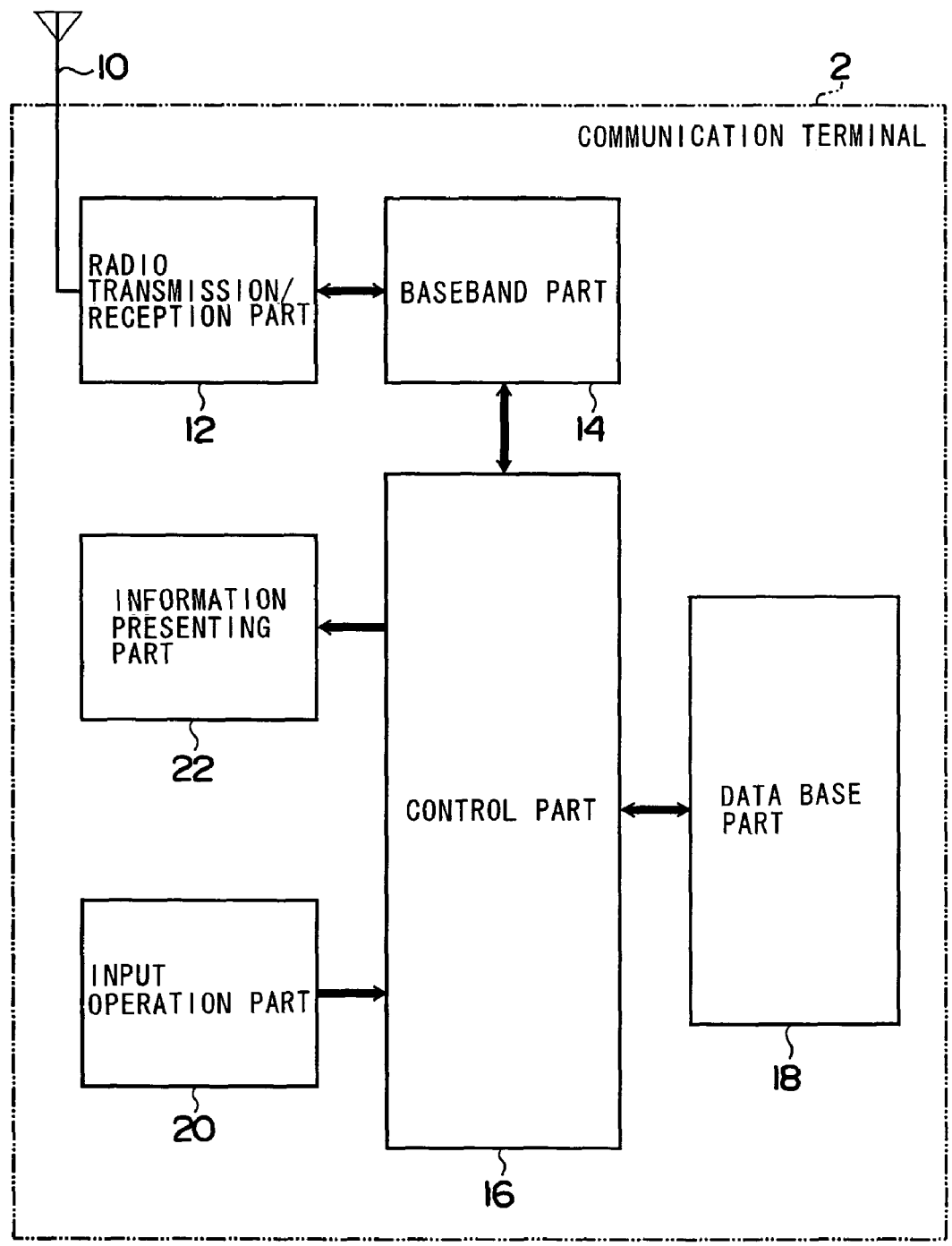
FIG. 1 is a block diagram showing an outline of a communication device representative of an embodiment of a communication device, an information processing method thereof and an information processing program thereof of the present invention.

FIG. 1 shows a communication device representative of an embodiment of a communication device, an information processing method thereof and an information processing program thereof of the present invention. This communication device can be mounted in various kinds of apparatuses, such as an information apparatus like a digital camera and a printer, and an AV (Audio Video) apparatus, in addition to a mobile terminal such as a mobile phone, PHS, PDA and a mobile PC.

A communication terminal 2 which is an example of a communication device can be used as a communication device by itself, and the communication terminal 2 is mounted in various kinds of apparatuses and is used. As various kinds of apparatuses, for example, there are an information apparatus like a digital camera and a printer, an AV apparatus and so on, in addition to a mobile terminal such as a mobile phone, PHS, PDA and a mobile PC. Although the communication terminal 2 or communication terminals X are used for the convenience of explanation, these include various kinds of apparatuses of an independent communication terminal, a mobile terminal having this communication terminal, and so on.

The communication terminal 2 constructs a radio system which performs information transmission or information exchange by means of transmission/reception by radio between the terminal 2 and the same kind of a device of the other party. For functions, the communication terminal 2 has a radio communication part which takes charge of radio communication, an information transmission part which takes charge of transmission of many kinds of information, such as identification information and information requiring the identification information to a device of the other party, an information reception part which takes charge of reception of many kinds of information, such as identification information reception receiving a plurality of pieces of identification information concerning a device of the other party, an information processing part which takes charge of various kinds of processes of information, a storage part which takes charge of memory of many kinds of information, a display part which takes charge of display of information and so on, an information input part which takes charge of input of many kinds of information, and so on. As hardware construction which realizes these functions, the communication terminal 2 is equipped with an antenna 10, a radio transmission/reception part 12, a baseband part 14, a control part 16, a data base part 18, an input operation part 20 and an information presenting part 22. The antenna 10 is tuned to a specific wave length, for example, in order to transmit and receive the specific frequency of 2.4 GHz with good efficiency.

The radio transmission/reception part 12 and the baseband part 14 are a radio part which transmits and receives, by radio, many kinds of information of a plurality of pieces of identification information and so on between the terminal 2 and a device of the other party to which the terminal 2 is connected. The radio transmission/reception part 12 has a radio transmission part which transmits a high-frequency signal through the antenna 10 and transmits a plurality of pieces of identification information concerning the communication terminal 2, and a radio reception part which receives a high-frequency signal from a device of the other party and receives a plurality of pieces of identification information concerning the device of the other party. The radio transmission part is equipped with a modulation circuit which diffusion-modulates a carrier wave signal with an information signal and generates a baseband modulation signal and so on which should be transmitted, a power amplifier which amplifies an output signal of the modulation circuit, and so on. The radio reception part is equipped with a high-frequency amplification part which amplifies directly the high-frequency signal received through the antenna 10, a demodulation circuit which demodulates the information signal from the high-frequency signal, and so on. The pieces of identification information comprise person's name information such as card information which is human information, proper information for specifying the communication terminal 2, and soon. The baseband part 14 takes charge of a link of an error correction, a packet management and so on of information which is transmitted and received. In this case, for information which is an object of transmission and reception, various kinds of data are included in addition to an image and a voice.

The control part 16 performs the reception of a plurality of pieces of identification information as a function, and also constructs the information processing part which takes charge of many kinds of information processes, such as a process which relates specifying information included in the pieces of identification information to the rest of the pieces of identification information, a process which records them, and a process which retrieves record contents. The control part 16 provides CPU (Central Processing Unit) as hardware which realizes the above-mentioned information processing, ROM (Read Only Memory) and RAM (Random Access Memory) as a storage device, and, in addition, a data base part which stores the proper information of the communication terminal 2, and so on. The CPU executes a communication process and an information process, the ROM stores fixed information and so on, and the RAM stores information in the middle of processing. Further, the control part 16 also has the data base part which stores various kinds of data used in information processing, for example, the proper information representative of the communication terminal 2.

The data base part 18 is a storage part which can store many kinds of information including the identification information for specifying the device of the other party, and is constructed by a writable and erasable storage device. The pieces of identification information specifying the device of the other party are stored as a data base by the information processing of the control part 16, and, for example, the pieces of identification information related to the specifying information out of the pieces of identification information specifying the device of the other party are stored. These pieces of identification information are the human information of an individual or a legal person specifying an owner or a manager of the communication terminal 2 or an apparatus having the communication terminal 2, the proper information representative of the communication terminal 2 or the apparatus having the communication terminal 2, and so on. The human information may also be identification information of the abbreviation of a name, a nickname and so on which can specify an individual or a legal person.

The input operation part 20 is constructed by a keyboard providing a plurality of character keys, symbol keys and so on, for example. Further, its shape may also be constructed by a touch sensor and so on. This input operation part 20 is used for a data entry and the designation of a device of the other party. The input operation part 20, for example, is used when designating a device of the other party by using history information presented by the information presenting part 22 which is constructed by a liquid crystal display and so on. The information presenting part 22 can also be constructed by a printer which prints information, in addition to the liquid crystal display which displays information on a screen. Further, the information presenting part 22 can also be constructed as an external unit.

In the communication terminal 2 according to this embodiment, an information processing program which is stored in the control part 16 serving as an information processing part and is executed has the following functions. For example, as functions which are executed by the communication terminal 2 serving as a communication device performing communication with a device of the other party, the information processing program has, firstly, a function which transmits and receives a plurality of pieces of information through communication with a device of the other party, secondly, a function which stores a plurality of pieces of identification information obtained by the transmission and reception with the device of the other party in the data base part 18 namely the storage part, and, thirdly, a function which retrieves the identification information from a storage part namely the data base part 18 by receiving input of specifying information out of the pieces of identification information, and which relates a result of that retrieval to the specifying information and outputs them or makes that output possible. Further, as another function, the information processing program has a function which relates the result of retrieval to the specifying information and presents them to the information presenting part 22.

Figure 2:
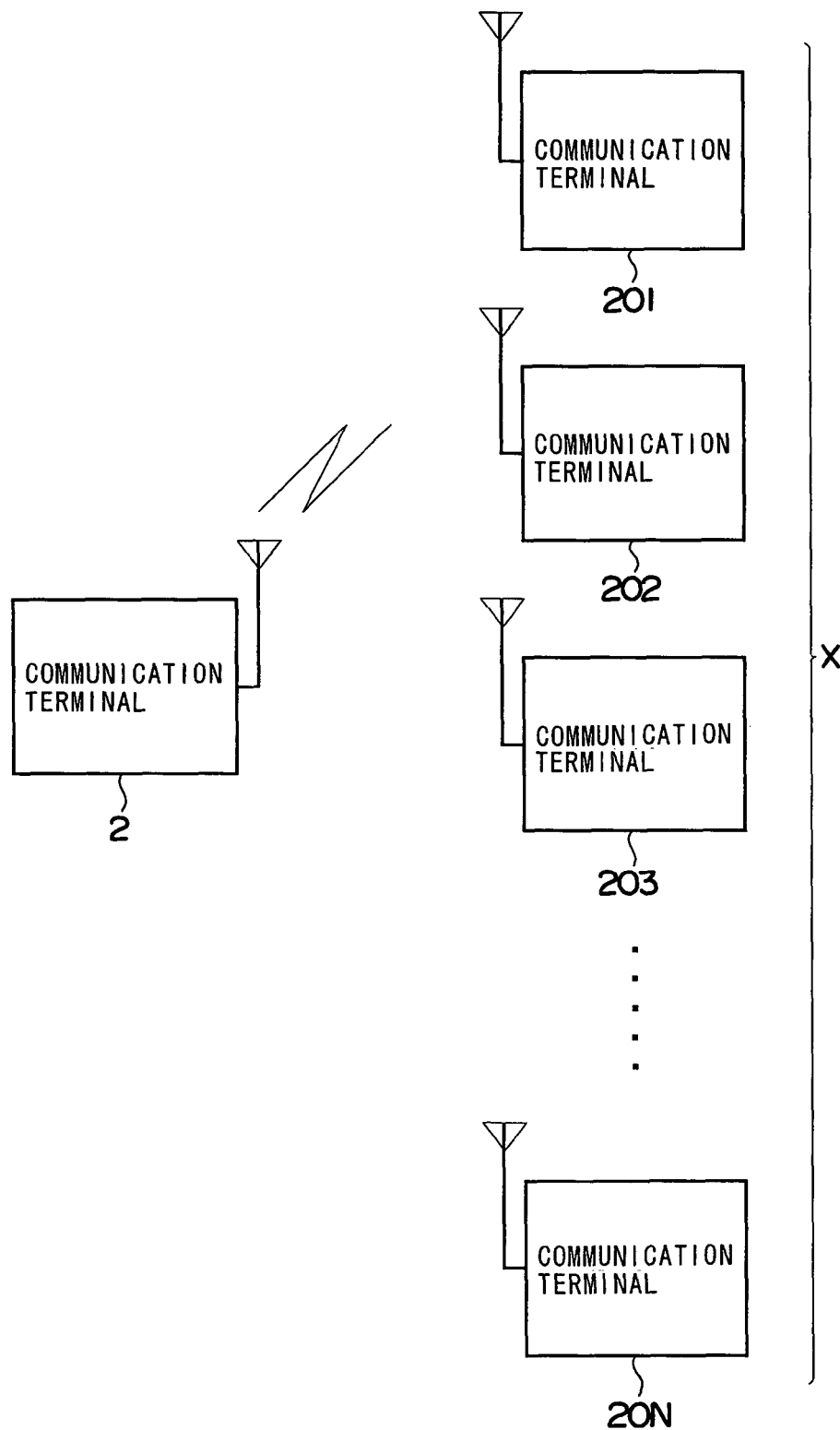
FIG. 2 is a block diagram showing a communication shape using the communication device according to the embodiment.

In case of performing communication with a device of the other party and information processing by using this communication terminal 2, as shown in FIG. 2 as an example, assuming that a plurality of communication terminals 201, 202, 203, . . . , 20N exist as a device of the other party within a range able to communicate, a confirmation process of whether or not a communication terminal X exists as a device of the other party able to communicate within the range able to communicate is performed. In this case, an inquiry signal is transmitted from the communication terminal 2, and a response signal is received to the communication terminal 2 from one or more communication terminals X (=the communication terminals 201, 202, 203, . . . , 20N) able to communicate.

Thereupon, as an optional communication terminal X, for example, if the communication terminal 202 is selected as a device of the other party, a plurality of pieces of identification information for specifying a device of the other party are transmitted and received each other between the communication terminal 2 and the communication terminal 202. The pieces of identification information received by the communication terminal 2 are formed as a data base by means of the information processing of the control part 16. That is, the rest of the pieces of identification information except the specifying information are related by the specifying information out of the pieces of identification information, and these pieces of identification information are stored as history information in the data base part 18. The pieces of identification information which are stored in the data base 18 are displayed as a shape related to the specifying information on the information presenting part 22.

Like this, under the state that the pieces of identification information are stored in the data base part 18, if the specifying information selected by a user is input from the input operation part 20, the control part 16 displays that specifying information on the information presenting part 22. In this case, display may also be performed by a calling operation or a selecting operation of the specifying information by means of the input operation part 20. Then, in a retrieval process of this, the database part 18 is retrieved based on the specifying information which is input or selected, and, as a result of that retrieval, a plurality of the pieces of identification information related to the specifying information are output, or these pieces of identification information related to the specifying information are processed to make that output possible.

To the information presenting part 22, along with the specifying information out of the pieces of identification information, the pieces of identification information related to this specifying information are presented. For example, if the specifying information is person's name information which is the human information, along with a person's name, the identification information such as a plurality of device names and device addresses is displayed so as to be capable of selecting under that individual name.

Thereupon, if a piece of identification information is selected from the pieces of identification information displayed on the information presenting part 22 by an input operation of the input operation part 20, for example, by a cursor, the identification information corresponding to the selection is specified. Then, a device of the other party specified by that identification information, for example, the communication terminal 202 is selected, and a connection process is performed. As a result of this, it is possible to perform information transmission and information exchange between the communication terminal 2 and the communication terminal 202.

As is clear from the embodiment described above, the communication terminal 2 constructs the following communication device. That is, the control part 16 designates proper address information which specifies an interface of a device of the other party on the occasion of communication, and the radio part comprising the radio transmission/reception part 12 and the baseband part 14 transmits the proper address information designated by the control part 16 to the device of the other party and receives that information from the device of the other party. Further, the control part 16 and the data base part 18 has a data base function which stores a plurality of pieces of identification information received from the device of the other party in the data base part 18, and performs management, for example, in which the pieces of identification information related to the specifying information are stored in the data base part 18 so that the pieces of identification information can be retrieved.

Further, the control part 16 functions as an information processing part. The control part 16, based on the input of the specifying information from the input operation part 20 or input connected with the specifying information, retrieves the pieces of identification information representative of the device of the other party from the data base part 18, and presents a result of that retrieval to the information presenting part 22. Then, by selective input from the input operation part 20, the control part 16 selects the proper address information which is the identification information representative of the device of the other party, and can starts the communication with the device of the other party.

Therefore, according to the above-mentioned embodiment, the following advantages can be obtained, for example.

(1) On the basis of the specifying information out of the pieces of identification information which are received from the device of the other party by means of a connection, the pieces of identification information are related to the specifying information and are stored in the data base part 18. By this, the identification information can be utilized for identifying and specifying the device of the other party, and thereby easiness and quickness of the identification and the specifying can be improved. Hence, it is possible to enhance a convenience of a mobile terminal having the communication terminal 2, and so on.

(2) Since the pieces of identification information which are stored in the data base part 18 are related to the specifying information, it is possible to present the pieces of identification information together with the specifying information to the information presenting part 22 by the input or selection of the specifying information. The device of the other party can be identified through the identification information from contents of that presentation with ease, and specifying the device of the other party becomes easy.

(3) The device of the other party is selected from identification information which is related by the specifying information and is presented to information presenting part 22, and thereby it is possible to shift to the connecting process. Because of this, time from the selection of the device of the other party till the connection with the device of the other party can be shortened, and the simplification of a connecting operation can also be obtained.

Next, more detailed embodiment of the communication device, the information processing method thereof and the information processing program according to the present invention is explained hereinafter.

This embodiment shows a communication device having the Bluetooth system as a short distance radio communication means, an information processing method thereof and an information processing program thereof. The embodiment, when receiving card information from a device of the other party, relates Bluetooth device information of the device of the other party and the card information, and records them. By this, the embodiment is constructed so that a connection with a device of the other party can be started by using specifying information like a full name as a key in the communication after next time.

Thereupon, in the communication terminal 2 having the Bluetooth system, the radio transmission/reception part 12 and the baseband part 14 are constructed by a Bluetooth radio transmission/reception part and a Bluetooth baseband part corresponding to Bluetooth. In that case, an address book is set in the data base part 18, and, along with the card information, a Bluetooth device address as a device address of a communication terminal X, a device name, a device address and CoD (Class of Device) received from a device of the other party as history information of communication, and so on are recorded so as to correspond to the card information. For communication with a Bluetooth communication terminal, a communication terminal X which is a device of the other party is designated by using these pieces of information.

In a program part set in the control part 16, a Bluetooth protocol and so on are stored, in addition to the information processing program according to the present invention. In this Bluetooth protocol, for example, LMP (Link Manager Protocol), L2CAP (Logical Link Control and Adaptation Protocol) and SDP (Service Discovery Protocol) are included. Bluetooth realizes various kinds of data communication functions by radio communication, and various kinds of functions are defined as a profile. As typical profiles, as shown in a table 1 as an example, various kinds of profiles of Generic Access, Service Discovery Application and so on exist. The table 1 shows each profile name and contents thereof.

TABLE 1

Typical profiles of Bluetooth

| | Profiles name | Contents |
|---|---|---|
| 1 | Generic Access | A definition of a low level communication function common in each upper profile |
| 2 | Service Discovery Application | A service discovery function (Discovery of profile information to which each device corresponds) |
| 3 | Cordless Telephony | A cordless telephone function (Parent device versus Child device) |
| 4 | Intercom | A transceiver function (Voice communication between child devices of the cordless telephone) |
| 5 | Serial Port | An emulation function equivalent to RS232C |
| 6 | Headset | A radio earphone and mic function. Monoral·Quality for talking(for non-Audio) |
| 7 | Dialup Networking | Utilizing a mobile phone and so on as a radio modem from PC and so on |
| 8 | Fax | Utilizing the mobile phone and so on as a FAX modem from the PC and so on |
| 9 | LAN Access Profile | A connection between a LAN access point utilizing PPP and the PC and so on |
| 10 | Generic Object Exchange | A data communication function equivalent to OBEX |
| 11 | Object Push | Data exchange of the v format, Card exchange function by the vCard 2.1 format |
| 12 | File Transfer | Transfer of ordinary data through a file format (a function equivalent to FTP) |
| 13 | Synchronization | A synchronization function of Phonebook·Schedule·mail·memo data equivalent to IrMC level 4 (Corresponding vCard, vCalender, vMessage, vNote) |

Figure 3:
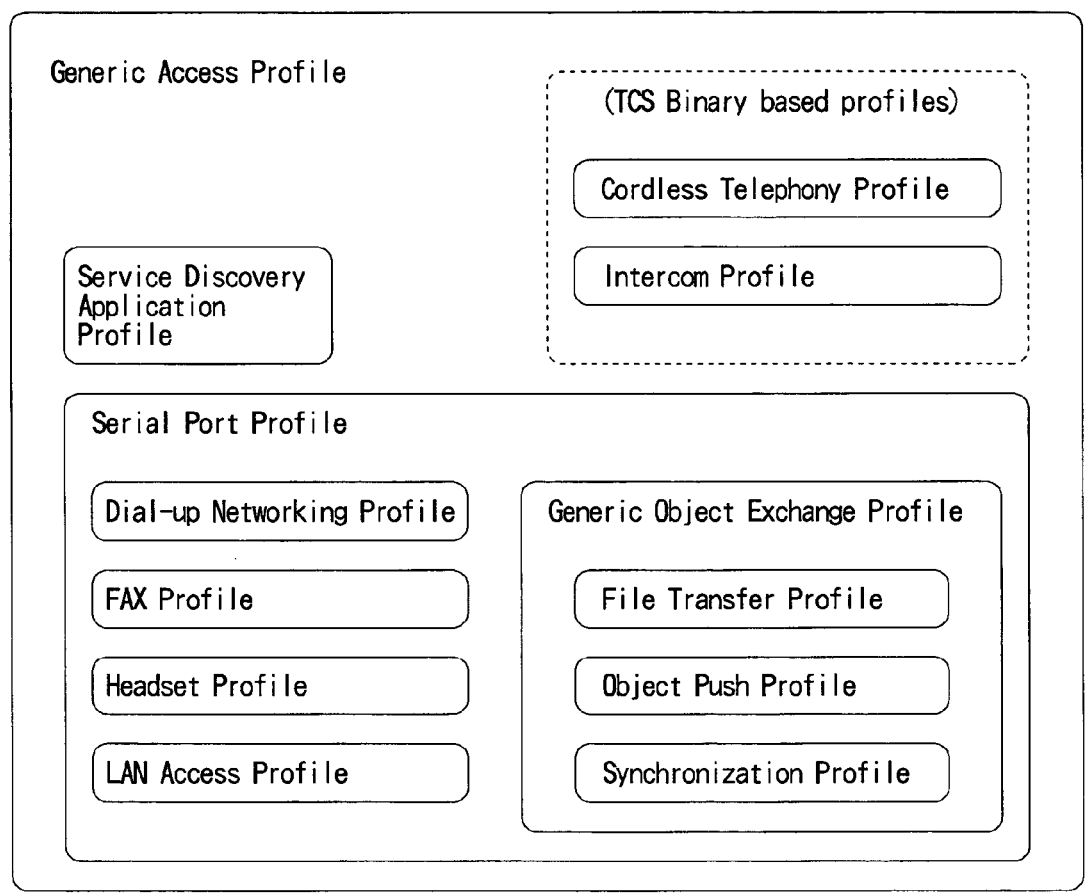
FIG. 3 is a drawing showing a hierarchy relation of typical profiles of Bluetooth.

Further, these profiles have a hierarchy relation shown in FIG. 3, for example. Besides, for information which is connected with various kinds of programs, information such as a device address (ex. a Bluetooth device address) and CoD of the communication terminal 2 is included. The CoD, for example, is information having 24 bits shown in tables 2 to 4. The table 2 represents information (Major Service Class) assigned to 23 bit-13 bit, and the table 3 represents information (Major Device Class) assigned to 12 bit-8 bit. The table 4 represents information (Minor Device Class) assigned to 7 bit-2 bit in case that Major Device Class is a computer class, and the table 5 represents information (Minor Device Class) assigned to 7 bit-2 bit in case that Major Device Class is a phone class.

TABLE 2

CoD (23-13bit: Major Service Class) of Bluetooth

| Bit no | Major Service Class |
|---|---|
| 13 | Limited Discoverable Mode |
| 14 | (reserved) |
| 15 | (reserved) |
| 16 | Positioning(Location identification) |
| 17 | Networking (LAN, Ad hoc, . . . ) |
| 18 | Rendering (Printing, Speaker, . . . ) |
| 19 | Capturing (Scanner, Microphone, . . . ) |
| 20 | Object Transfer (v-Inbox, v-Folder, . . . ) |
| 21 | Audio (Speaker, Microphone, Headset service, . . . ) |
| 22 | Telephony(Cordless telephony, Modem, Headset service, . . . ) |
| 23 | Information (WEB-server, WAP-server, . . . ) |

TABLE 3

CoD (12-8 bit: Major Device Class) of Bluetooth

| | | bit | | | |
|---|---|---|---|---|---|
| 12 | 11 | 10 | 9 | 8 | Major Device Class |
| 0 | 0 | 0 | 0 | 0 | Miscellaneous |
| 0 | 0 | 0 | 0 | 1 | Computer(desktop, notebook, PDA, organizers, . . . ) |
| 0 | 0 | 0 | 1 | 0 | Phone(cellular, cordless, payphone, modem, . . . ) |
| 0 | 0 | 0 | 1 | 1 | LAN/Network Access Point |
| 0 | 0 | 1 | 0 | 0 | Audio/Video (headset, speaker, stereo, video display, vcr . . . ) |
| 0 | 0 | 1 | 0 | 1 | Peripheral(mouse, joystick, keyboards, . . . ) |
| 0 | 0 | 1 | 1 | 0 | Imaging(printing, scanner, camera, display, . . . ) |
| 1 | 1 | 1 | 1 | 1 | Unassignment |

TABLE 4

CoD of Bluetooth (A case that Major Device Class is a Computer Class, 7-2 bit: Minor Device Class)

| | | bit | | | |
|---|---|---|---|---|---|
| 7 | 6 | 5 | 4 | 3 | 2 | Minor Device Class |
| 0 | 0 | 0 | 0 | 0 | 0 | Unassignment |
| 0 | 0 | 0 | 0 | 0 | 1 | Desktop workstation |
| 0 | 0 | 0 | 0 | 1 | 0 | Server-class computer |
| 0 | 0 | 0 | 0 | 1 | 1 | Laptop |
| 0 | 0 | 0 | 1 | 0 | 0 | Handheld PC/PDA (clam shell) |
| 0 | 0 | 0 | 1 | 0 | 1 | Palm sized PC/PDA |
| 0 | 0 | 0 | 1 | 1 | 0 | Wearable computer (Watch sized) |

TABLE 5

CoD of Bluetooth (A case that Major Device Class is a Phone Class, 7-2 bit: Minor Device Class)

| | | bit | | | |
|---|---|---|---|---|---|
| 7 | 6 | 5 | 4 | 3 | 2 | Minor Device Class |
| 0 | 0 | 0 | 0 | 0 | 0 | Unassignment |
| 0 | 0 | 0 | 0 | 0 | 1 | Cellular |
| 0 | 0 | 0 | 0 | 1 | 0 | Cordless |
| 0 | 0 | 0 | 0 | 1 | 1 | Smart phone |
| 0 | 0 | 0 | 1 | 0 | 0 | Wired modem or voice gateway |
| 0 | 0 | 0 | 1 | 0 | 1 | Common ISDN Access |
| 0 | 0 | 0 | 1 | 1 | 0 | Sim Card Reader |

In case that the communication terminal 2 constructs a mobile terminal like a mobile phone and PDA, an address book function which performs data processing connected with an address is provided in the control part 16, and an address book DB (Data Base) is constituted in the data base part 18. For example, as for an address book of a mobile phone, this address book function, in respect to one person's name, relates phone numbers of a fixed telephone and/or a mobile phone, an e-mail address and so on used by that person to the person's name and stores them, and forms them as data base. Therefore, as a plurality of pieces of identification information, a device address, a device name and CoD of the communication terminal 2 or X are registered in a person's name, of a person who uses or manages the communication terminal 2 or X, which is registered in registration items of an address book of the data base part 18.

Further, in the communication terminal 2 or X, the object push profile out of profiles shown in FIG. 3 has a function (a card exchange function: a function called Business Card Exchange or Business Card Pull on a proper form) for exchanging owner information of a plurality of communication terminals X (=communication terminals 201, 202, 203, ..., 20N), which are a device of the other party, with the vCard format. The communication terminal 2 having a function like this can exchange terminal owner information (vCard format data) including a user name, an e-mail address, a phone number and so on with other communication terminals 201, 202, ..., 20N having the same function. The owner information of a device of the other party obtained by using this card exchange function can be recorded in an address book application namely the data base part 18 in the communication terminal 2 as it is. Thereupon, in the data base part 18, the card information which is specifying information out of the pieces of identification information obtained from a device of the other party through communication, and a Bluetooth device address, a device name, CoD and so on which are the pieces of identification information obtained at the same time are related to the card information namely the specifying information and are registered.

Figure 4:
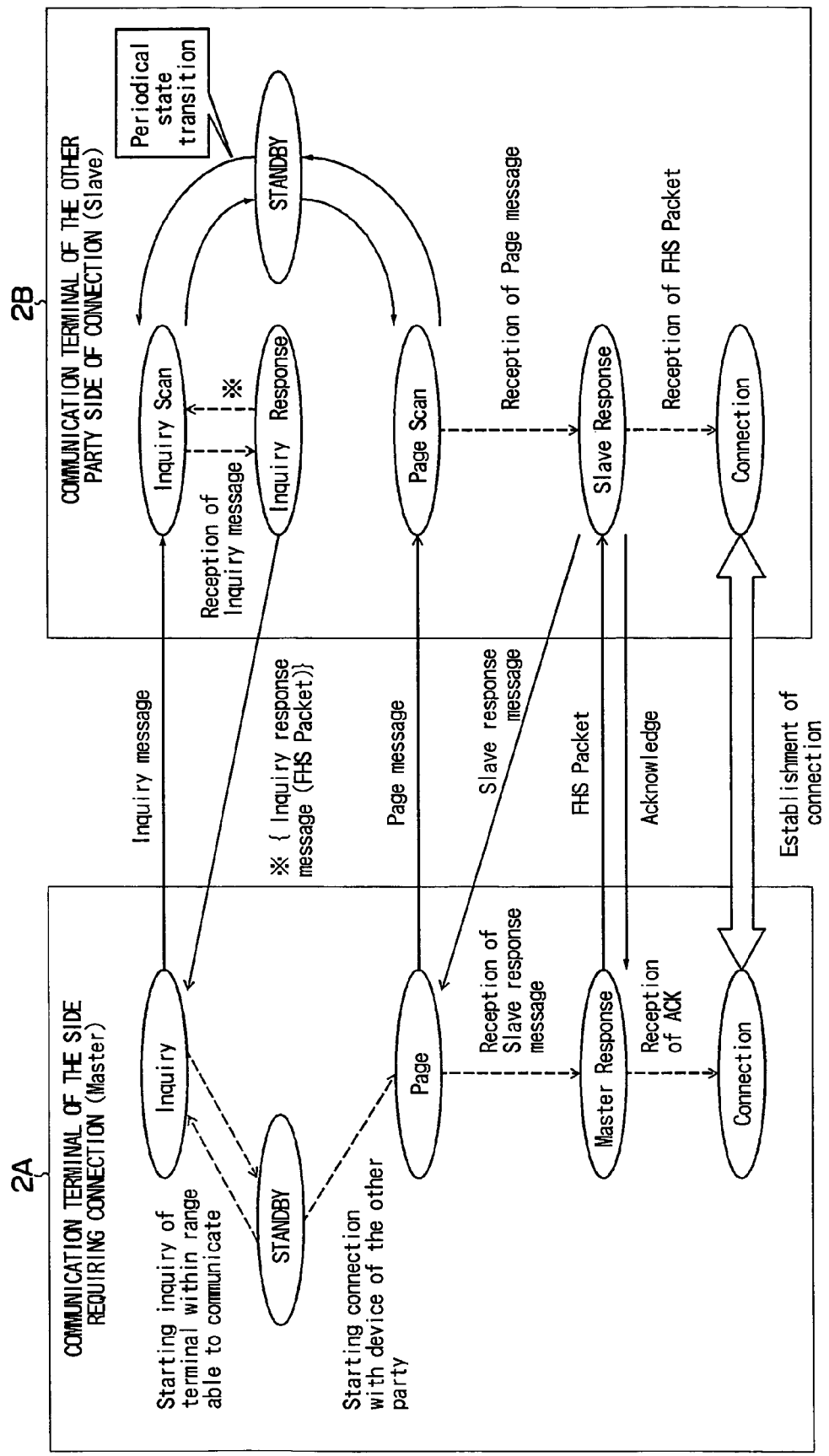
FIG. 4 is a drawing showing an inquiry and connection procedure of a communication terminal within a communication range of Bluetooth.

Thereupon, a inquiry of a terminal existing within a communication range of Bluetooth and a connection procedure between terminals are explained by referring to FIG. 4. FIG. 4 shows an example of an inquiry of a terminal and a connection procedure.

For communication between terminals having a Bluetooth device, it is necessary to recognize a Bluetooth device address (48 bits) of a device of the other party. In case of communicating with a terminal with which a user has not communicated before, a requirement of identification information and an inquiry message representative of an inquiry are transmitted from the side of a communication terminal 2A (a master) of a side which wants to start communication, and a terminal able to communicate, which exists within a range able to communicate, is inquired. If the terminal able to communicate exists, the side of a communication terminal 2B (a slave) of the other party side of the communication responds with an inquiry response message.

Figure 5:
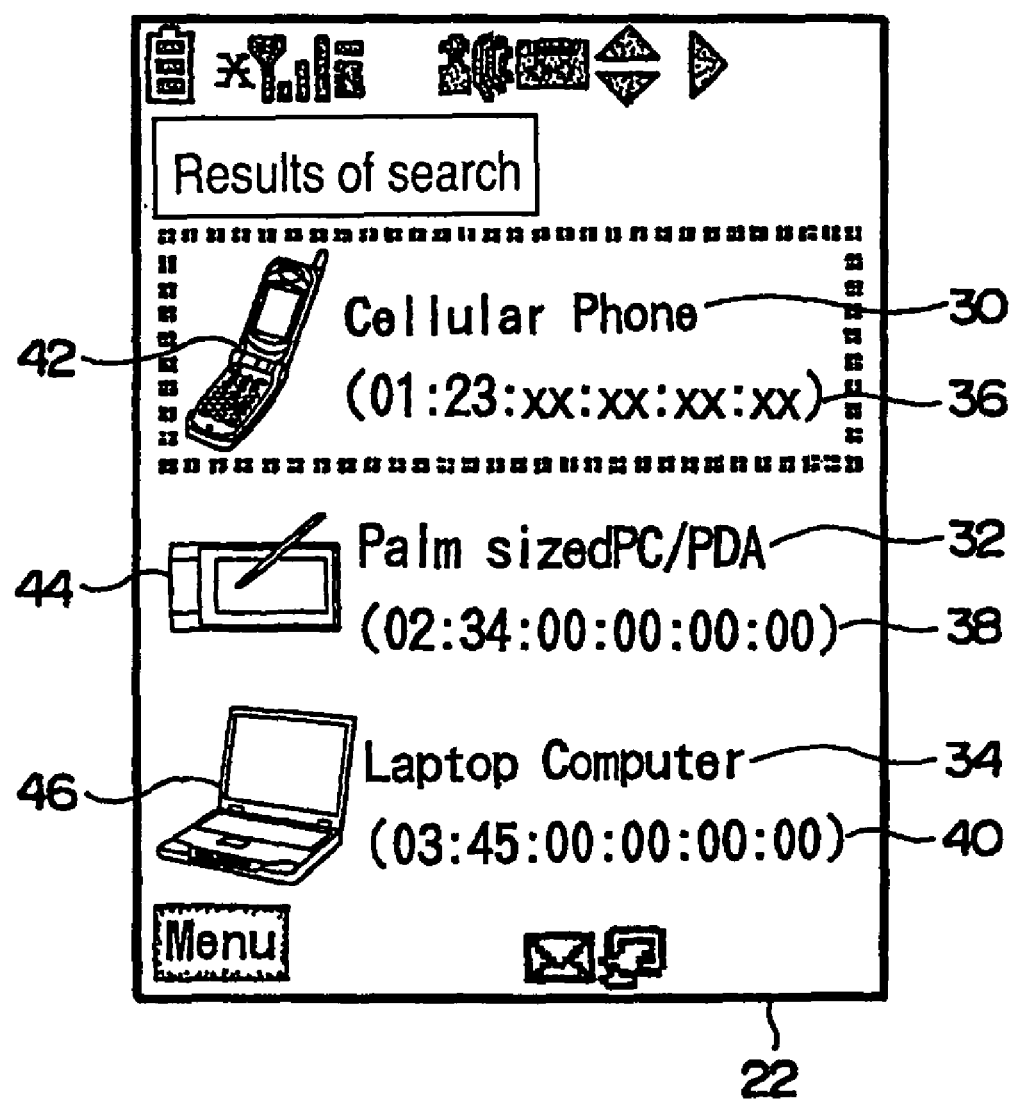
FIG. 5 is a drawing showing a display screen representative of a retrieved result.

The inquiry response message is transmitted with a packet data, and this packet data, for example, is transmitted with FHS packet (Frequency Hopping Sequence packet) format. The inquiry response message includes information of an Bluetooth device address, CoD and so on of the side of the communication terminals 2B which responds. In the communication terminal 2A of the master side, terminal information of a terminal candidate able to communicate, which is obtained by the inquiry, is displayed on the information presenting part 22 serving as a UI (User Interface) and is informed a user. On a screen of the information presenting part 22, for example, a display screen shown in FIG. 5 is displayed, and one or plural device names, device addresses, CoDs and so on obtained by a result of the inquiry are displayed. In FIG. 5, displays 30,32 and 34 are the CoDs, displays 36, 38 and 40 are the device addresses, and displays 42, 44 and 46 are icon displays corresponding to the CoDs. A user selects a device of the other party, with which the user wants to communicate, from a retrieved result (検索結果) displayed in the screen of the terminal, and starts a connection process.

Figure 6:
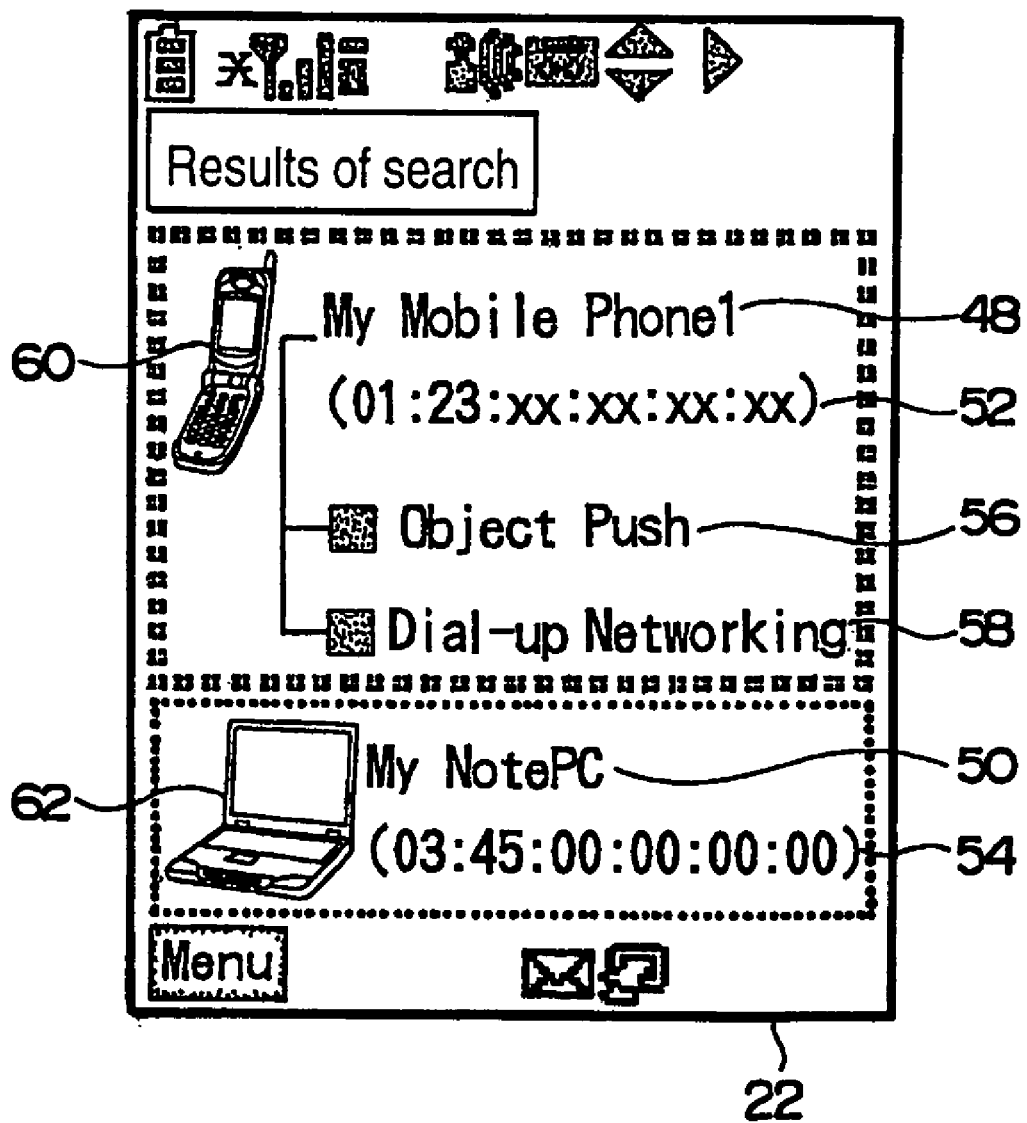
FIG. 6 is a drawing showing a display screen representative of a retrieved result.

Further, in the Bluetooth system, a device name is given. Generally, a device manufacturer has registered a specific character string as a device name in that device at the time of a shipment. However, that device name can be changed by a user after purchase of that. Further, a protocol for inquiring of a device of the other party about this device name has been prepared. However, as shown in FIG. 6 as an example, if this device name is displayed on the information presenting part 22, a convenience for identification, confirmation or selection of a device of the other party is enhanced. In FIG. 6, displays 48 and 50 show the device names, displays 52 and 54 show the device addresses, displays 56 and 58 show information of the profiles, and displays 60 and 62 show icon displays corresponding to the CoDs.

In the Bluetooth system, information of each terminal obtained by communication connection is registered, and it is possible to start a connection by utilizing that information. In order to obtain security thereof, the Bluetooth system has a function which makes it the condition of a connection to input the same PIN code (Personal Identify Number code) in the master side and the slave side. The PIN code is converted into secret key information called a link key, and is stored in the data base part of the control part 16 together with the device address, for example. These PIN code and device address are utilized for establishment of a connection with a communication terminal X (=communication terminal 201, 202, ..., or 20N) to which a user wants to connect. The PIN code or link key may also be stored in the data base part 18.

Thereupon, in this embodiment, the communication device, the information processing method thereof and the information processing program thereof constitute an address book DB in the data base part 18, and is constituted so that, when receiving owner information from a communication terminal X namely a device of the other party by Bluetooth, a Bluetooth device address of the communication terminal X obtained at the time of communication is recorded in the address book DB by using an owner's name included in the owner information as a key.

Figure 7:
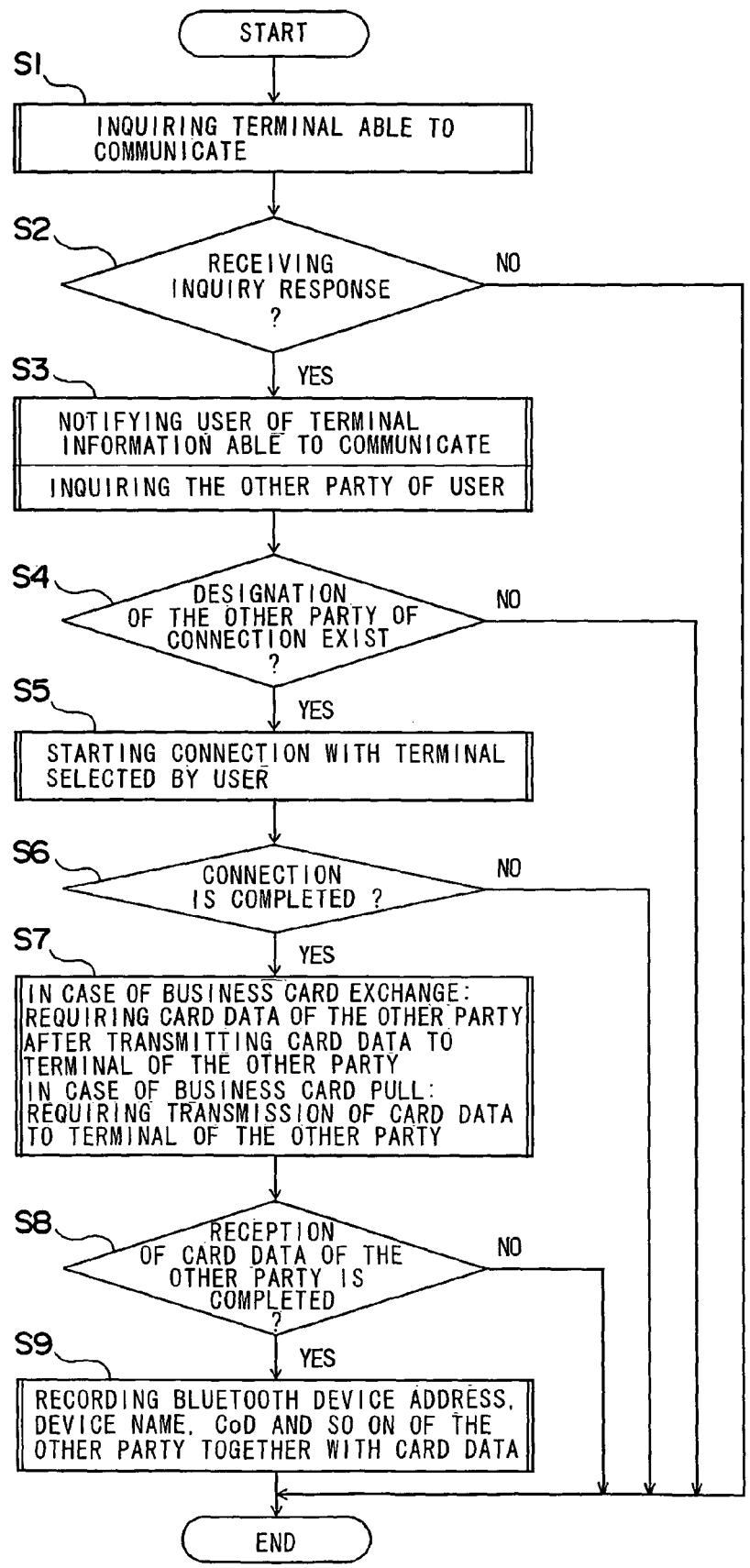
FIG. 7 is a flow diagram showing a card exchange process.

In the constitution mentioned above, a card exchange process is explained by referring to a flow diagram shown in FIG. 7 as an example.

In the Bluetooth system, when performing a card information exchange with a person that a user meets for the first time, the system performs an inquiry operation at a step S1, and inquires a device of the other party. At a step S2, the system decides whether or not an inquiry response signal is received. If the device of the other party comes responding with an inquiry response message, the system proceeds to a step S3. At the step S3, the system displays terminal information able to communicate, namely a device address, CoD and so on, as a plurality of pieces of identification information included in that message on the information presenting part 22, and notifies the user of it. Along with this, the system inquires of the user about a device of the other party and requests the confirmation of a connection. At the following step S4, the system decides whether or not the user designates a device of the other party to be connected.

At the step S4, if the user designates a device of the other party to be connected, the system starts connecting to a communication terminal X selected by the user at a step S5, and confirms at a step S6 whether or not that connection is completed. After the connection, the system proceeds to a step S7, and demands card information to the communication terminal X which is the device of the other party. In case that software concerning the giving and receiving of the card information is the Business Card Exchange, the system is to demand the card information of the other party after transmitting card information to the communication terminal X namely the device of the other party. In case of the Business Card Pull, the system is to demand transmission of the card information to the communication terminal X namely the device of the other party.

At the following step S8, the system decides whether or not reception of the card information from the communication terminal X which is the device of the other party is completed. If the reception of that data is completed, the system proceeds to a step S9. At the step S9, various kinds of data of a phone number, an e-mail address, an address and so on included in the card information as a plurality of identification data out of contents of that are related to a full name data namely the specifying information, and are recorded in the address book DB which is established in the data base part 18.

Figure 8:
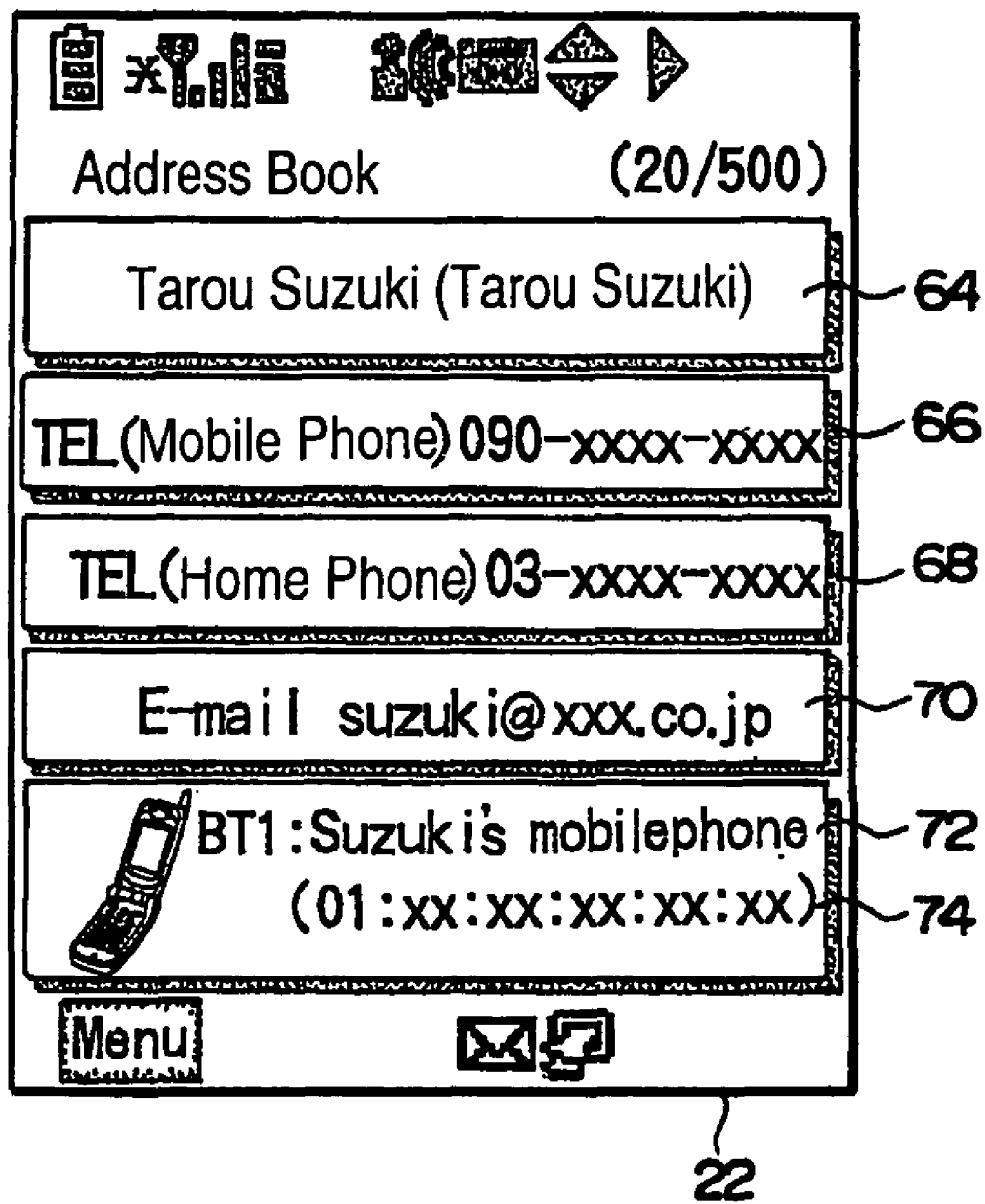
FIG. 8 is drawing showing a display screen in an address book application.

In this case, the pieces of identification information of the Bluetooth device address, the device name, the CoD and so on of the communication terminal X namely the device of the other party used in the communication are related to the full name data which is the specifying information, and are stored in the address book DB. When corresponding profile information is obtained through the SDP, this is also stored in the data base part 18 at the same time. FIG. 8 is an example of a plurality of pieces of identification information stored in the data base part 18, and shows the pieces of identification information displayed on the information presenting part 22. In FIG. 8, display 64 is a full name, display 66 is a mobile phone number, display 68 is home telephone number, display 70 is an e-mail address, display 72 is a device name of Bluetooth mounted in a communication terminal X which is a device of the other party, and display 74 is a CoD list.

Further, in the communication device, the information processing method thereof and the information processing program thereof according to this embodiment, a display part which displays a person's name list stored in the address book DB constituted by the data base part 18 can be constituted by the information presenting part 22, an input part of a result of selection by a user from the person's name list can be constituted by the input operation part 20, and a connection selecting part can be constituted by the control part 16. The connection selecting part constituted by the control part 16 is constituted so that the address book DB is retrieved by using a person's name selected by a user as a key, and so that it is possible to start communication through the Bluetooth system by using a Bluetooth device address obtained from that retrieval.

Figure 9:
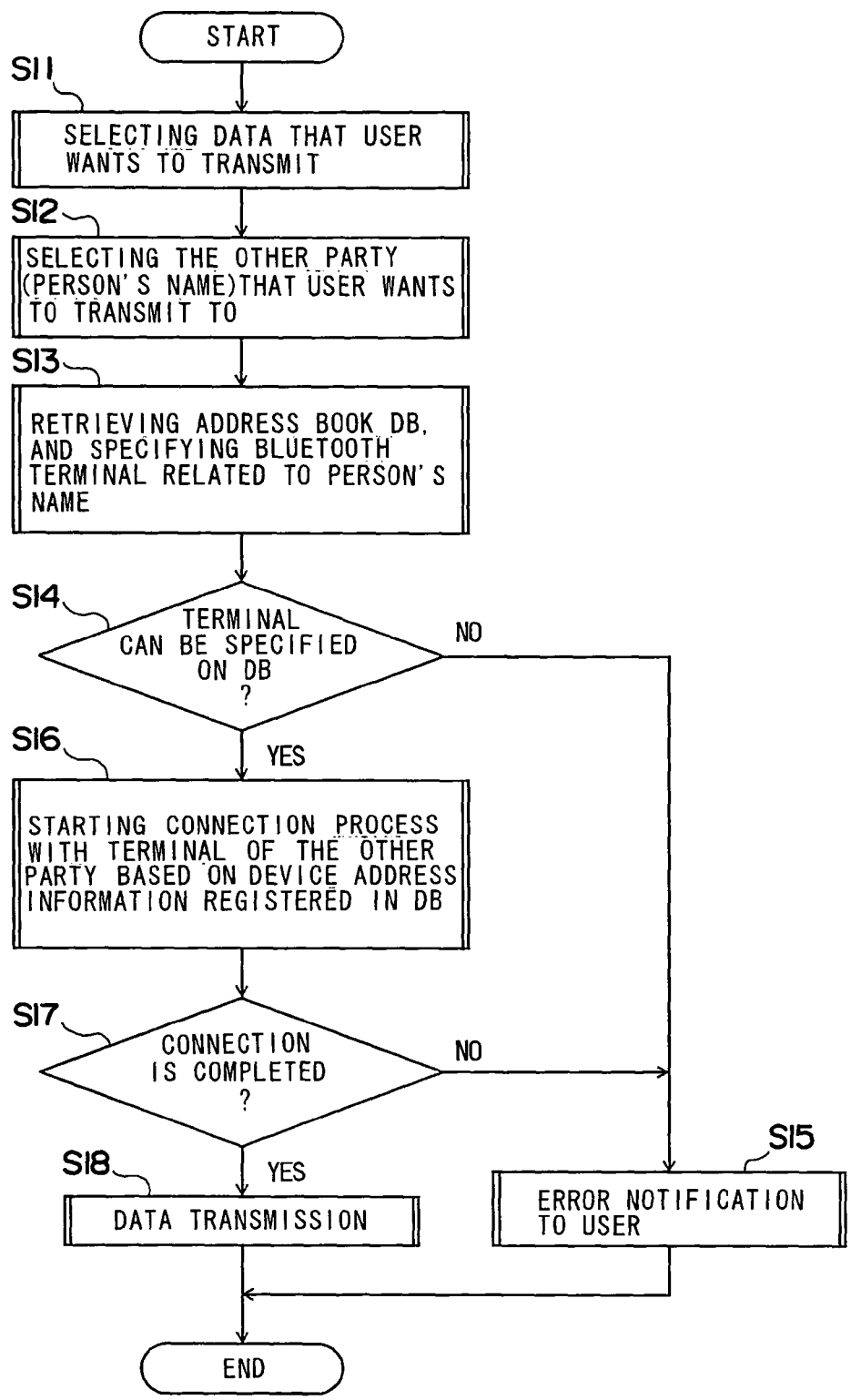
FIG. 9 is a flow diagram showing a communication process using identification information related to a person's name.

A connecting operation of the above-mentioned constitution is explained by referring to a flow diagram shown in FIG. 9 as an example.

In case of a mobile terminal of a mobile phone, PDA and so on basically suitable for the card information exchange, by an address book application installed in a communication terminal X which is constituted with the Bluetooth system, it is necessary that the Bluetooth device address and so on have been related to the specifying information out of the pieces of identification information, for example, identification information representative of a person and have been registered in the address book DB of the data base part 18.

In this case, at a step S11, the system selects a data, which a user wants to transmit, from the information presenting part 22 of the communication terminal 2. After that, at a step S12, the system displays the other party of transmission (a person' name), which is the identification information, on the information presenting part 22. And then, the system selects a person namely the other party that receives transmission, and designates that person. At a step S13, the system retrieves the address book DB from the data base 18 by using this person as specifying information, and specifies a communication terminal X having Bluetooth from the identification information related to the designated person that is a result of the retrieval. In this case, at a step S14, the system decides whether or not a terminal can be specified by using display, for example, the display 74, representative of the communication terminal X which is the retrieved result of the data base part 18. If the system can not specify the display 74, the system proceeds to a step S15, and performs a notification representative of error indication and so on to the information presenting part 22 and terminates this connection operation.

On the other hand, for example, if the communication terminal X can be specified from the display 74, the system proceeds to a step S16, and starts a process of connection with the communication terminal X namely the device of the other party by using the device address information registered in the address book DB of the data base part 18. After the start of this connection process, the system decides at a step S17 whether or not the connection is completed. If the connection is not completed, the system proceeds to the S15, and performs a notification representative of error indication and so on to the information presenting part 22 and terminates this connecting operation. On the other hand, if the connection is completed at the step S17, the system proceeds to a step S18 and performs data transmission.

Like this, on the occasion of transmitting and receiving data by utilizing Bluetooth, the system designates a person from the address book DB, and can perform the connecting operation thence. Once the Bluetooth device address which is the identification information is stored in the address book DB, the connection process can be performed by utilizing that identification information. In addition to the connection process, if a device address is recorded on the occasion of exchanging a schedule (vCalender) and/or memo (vNote) data and so on through Bluetooth, this identification information can be utilized on the occasion of performing display of each data in each application as well. For example, by retrieving a user name from the device address which is identification information, "from whom was that data received?" or "to whom was that data transmitted before?" can be displayed on UI of the communication terminal 2, namely the information presenting part 22.

Figure 10:
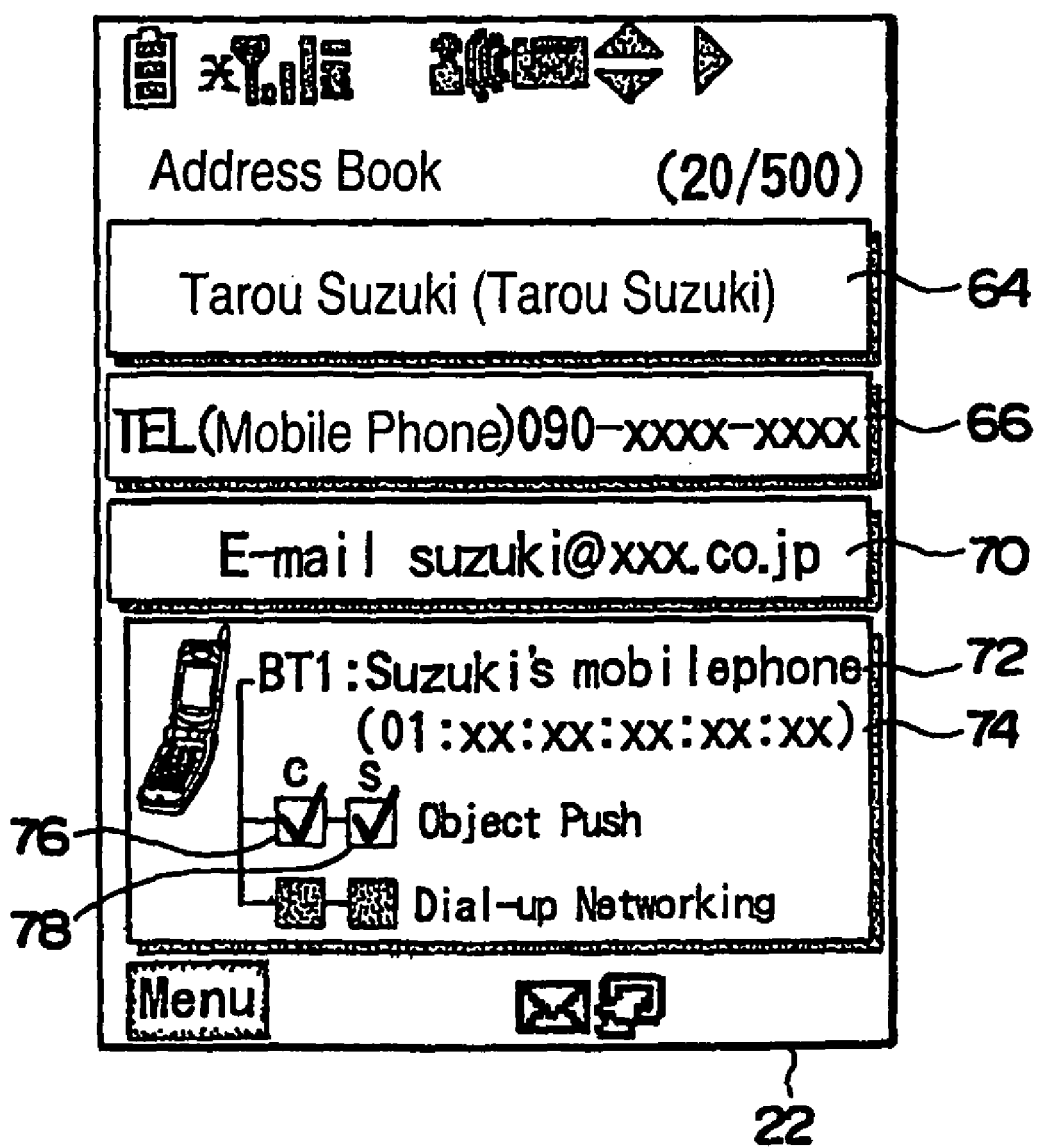
FIG. 10 is a drawing showing a display screen of profile information and an example of designation possible of connection.

By the way, the communication terminal 2 having Bluetooth also records the corresponding profile information in the address book DB of the data base part 18 at the same time, and may be set so that a user can designate a profile used when communicating with another communication terminal X. according to this, in each profile of Bluetooth, the two kinds of a side (a client) requiring a connection and a side (a server) required a connection are to exist. FIG. 10 is a plurality of pieces of identification information stored in the data base part 18, and shows profile information of the pieces of identification information displayed on the information presenting part 22. On the information presenting part 22, selection displays 76 and 78 able to designate a profile used for a connection are displayed, in addition to the display 72 showing the device name and the display 74 showing the list of CoD of Bluetooth mounted in the communication terminal X which is a device of the other party. Further, in FIG. 10, "C" shows a client, and "S" shows a server. The system is constituted so that the permission and designation of a connection can be performed in relation to each of client and server.

Further, this embodiment has a function that designates a profile used for a connection in relation to each Bluetooth which is registered, in the address book DB constituted by the data base part 18. The connection selecting part constituted by the control part 16 is constituted so that the connection selecting part retrieves the address book DB by using a person's name selected by a user as a key, determines a profile used for a connection in the above-mentioned profile designation when starting Bluetooth communication by using a Bluetooth device address obtained from that retrieval, and connects by a procedure according to that profile.

Figure 11:
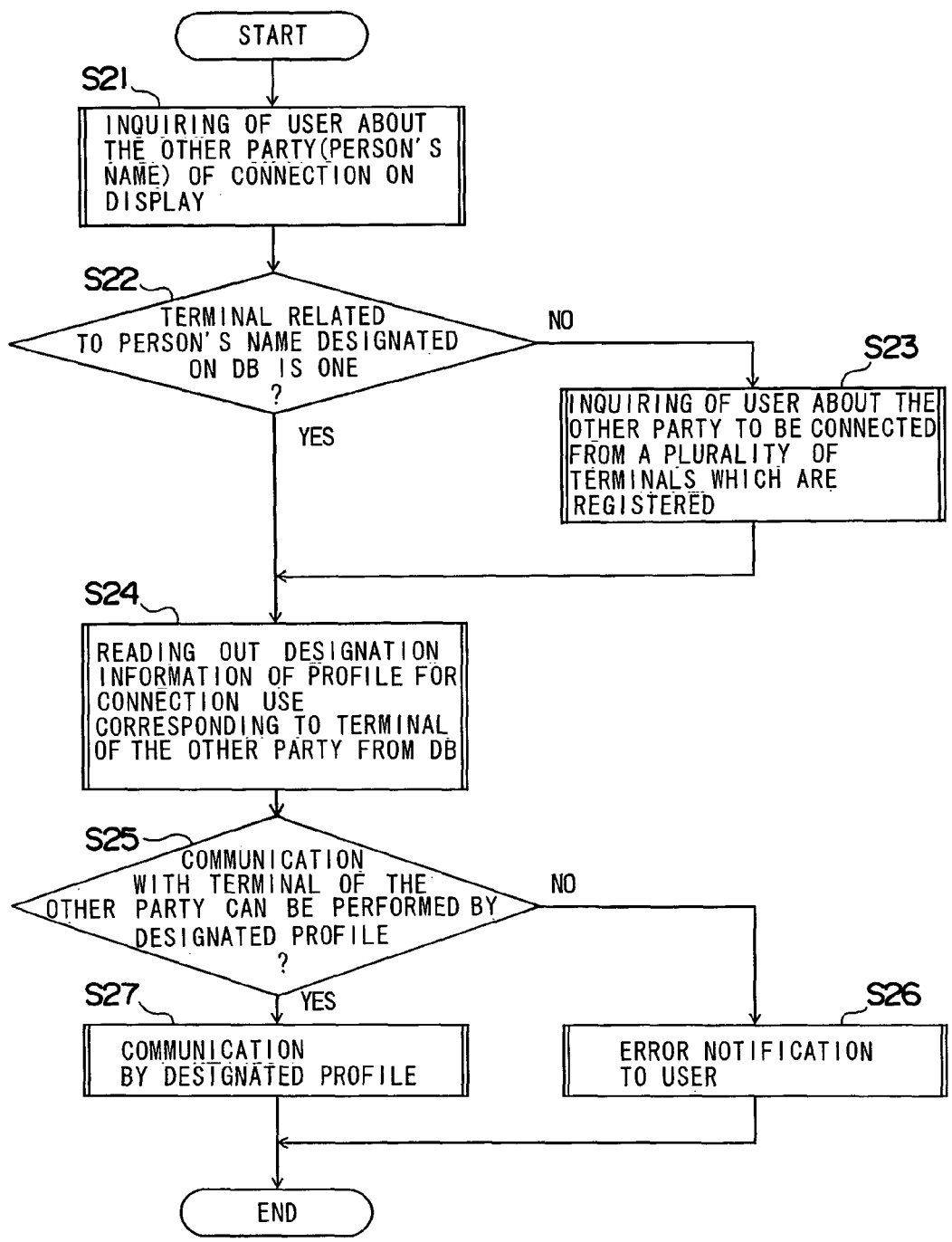
FIG. 11 is a flow diagram showing a communication process by a profile for connection use related to a person's name.

A connecting operation of the above constitution is explained by referring to a flow diagram shown in FIG. 11 as an example.

At a step S21, the system displays the other party (a person's name) to be connected on the UI namely the information presenting part 22, and performs an inquiry to a user. At a step S22, the system decides whether or not a communication terminal X related to the person's name designated on the address book DB of the data base part 18 is one. If the number of communication terminals is not one, the system proceeds to a step S23, and inquires of the user about the other party to be connected from a plurality of communication terminals X which are registered.

Next, at a step S24, the system reads out profile designation information for connection use corresponding to a communication terminal X of the other party from the data base part 18, and proceeds to a step S25. At the step S25, the system decides whether or not it is possible to communicate with the communication terminal X of the other party by a designated profile. If the communication is impossible, the system proceeds to a step S26 and terminates this process after performing an error notification. On the other hand, if the communication is possible by the designated profile, the system proceeds to a step S27 and performs the communication through the designated profile.

In this case, designation of the server can be made to function as setting of whether to permit or refuse a connection from the other party, and further, designation of the client can also be made to function as connection profile designation of default on the occasion of designating a communication terminal X namely a device of the other party without designating a profile.

In the address book application, it is possible to set a group function which classifies person's names in groups of a family, a co-worker and so on according to category information due to the designation of a user. By being linked to a group designation of the address book like this, it is possible to perform a selection process of the permission of a connection and the refusal of a connection by a specific profile, in relation to a communication terminal X having Bluetooth owned by every group.

Thereupon, this embodiment provides an address book function that has a function classifying full name data in groups, and a function that designates access permission for every group, namely an every group access permission designation function. The every group access permission designation function is constituted so as to be able to set in a lump whether or not to permit a connection through a specific profile from a communication terminal X which has a Bluetooth system related to a person's name belonging to a group designated by the address book.

Operation of the above-mentioned constitution is explained by referring to a flow diagram shown in FIG. 12 as an example.

At a step S31, the system designates a group registered in the address book DB of the data base part 18, and inquires at a step S32 whether or not a user performs the setting of a connection requirement side (a client side). If the user performs this setting, the system proceeds to a step S33, and designates a registration profile from groups of the address book DB. On the other hand, if the user does not perform this setting, the system proceeds to a step S34. At the step S34, the system designates a connection permission profile of a case where a communication terminal X of the user, for example, the communication terminal 2 behaves as a server, and terminates this process.

Further, this embodiment is constituted so that necessary information for communication such as a device address is previously transmitted as identification information to a communication terminal X, which is not performing communication with the Bluetooth system, by using other communication means of a telephone, an e-mail and soon, and so that the identification information is used for the communication by registering it in the data base part 18. According to a constitution like this, even when communication is performed for the first time, it is possible to omit the acquisition of identification information and the confirmation of a user which are necessary on the occasion of a start of communication. That is, in case that a communication terminal X which is a device of the other party exists certainly within a range able to communicate, the other party of communication is selected from the address book DB, and a communication terminal X of the other party is automatically selected. Therefore, it is possible to make a user operation from a start of communication to an end thereof unnecessary or simplify.

Figure 13:
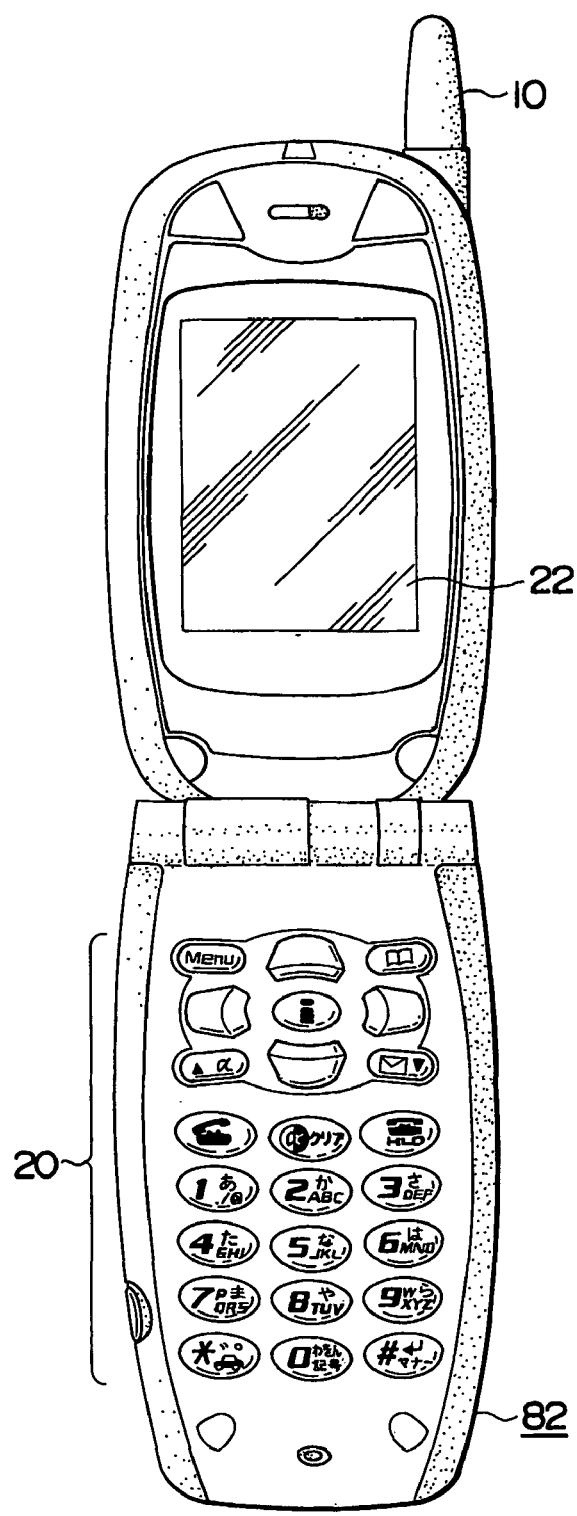
FIG. 13 is a front view showing a mobile phone according to the embodiment.

For example, the present invention is applied to a mobile terminal of a mobile phone 82 shown in FIG. 13, PDA 84 shown in FIG. 14, a note type personal computer 86 shown in FIG. 15, and so on. Further, although drawings are not shown, the present invention is provided to various kinds of apparatuses of an information apparatus such as a digital camera and a printer, an AV (Audio Video) apparatus and so on, and can be utilized for a transmission process and a exchange process of many kinds of information. In the mobile phone 82 shown in FIG. 13, the PDA 84 shown in FIG. 14 and the note type personal computer 86 shown in FIG. 15, common portions with the communication terminal 2 shown in FIG. 1 have the same reference numerals, and these explanations are left out.

The communication device, the information processing method thereof and the information processing program thereof according to the embodiment described above are further made reference.

In the communication terminal 2 or X having the Bluetooth system, private history information representative of a communication terminal to which inquiry or communication was performed in the past is in existence. Since this history information is a device name, a device address, CoD and so on, it is possible to designate the other party of a connection by using these pieces of information. In the history information, for example, the device name is previously set by a device manufacturer, or a user can modify it after purchase. If a plurality of communication terminals having the same CoD, of which device names are not modified or cannot be modified, exist within a range able to communicate, a device address which is identification information will be the only identification means. However, in case that a device name is hard to identify, it is troublesome to specify a communication terminal 2 or X of the other party from display of the information presenting part 22. The most major problem is that a user can not recognize human relation of an owner and so on of the communication terminal 2 or X by these pieces of history information. This is not a problem in a limited range such as short distance communication between specific communication terminals owned by a user. However, if a lot of apparatuses having the Bluetooth system exist and relation of a connection with other people increases, a convenience of data exchange and so on in short distance communication by radio is to lower.

Contrary to this, the communication device according to the embodiment described above can improve usability in case that the Bluetooth system is provided. For example, in a mobile phone, it is possible to relate a plurality of pieces of identification information of a Bluetooth device address and so on representative of the other party of communication and a communication terminal thereof in the card information exchange to specifying information included in the pieces of identification information, and to record them as a data base. In this registration process, a user does not need to be conscious of a record process of the identification information, and, further, complicated operation are also unnecessary.

The pieces of identification information registered in the data base part 18 as described above, at the time of subsequent communication, are related to the specifying information out of the pieces of identification information, for example, person's name information, and the identification information representative of a communication terminal is retrieved. Then, the identification information is presented together with the person's name information from a result of that retrieval, and a communication terminal to which a user wants to connect can be selected.

Therefore, at the time of transmission of a telephone, an e-mail and so on, it is possible to make use of a communication function of the Bluetooth system, like an operating procedure in which a user selects the other party of communication from the address book. Because of this, it is possible to enhance the convenience of information transmission and information exchange by the short distance radio communication.

(Examples of Modification)

(a) In the embodiments, the communication device to which the Bluetooth system is applied, the information processing method thereof and the information processing program are explained. However, the present invention can also be applied to communication technology, a communication standard and so on except the Bluetooth system, and its application is not limited to the Bluetooth system.

(b) In the embodiments, the short distance communication by radio is explained as an example. However, the present invention can also be applied to long distance communication utilizing a frequency band such as a low frequency, a medium frequency, a high frequency and a very high frequency band, and is not limited to the short distance radio.

(c) In the embodiments, as an identification information reception part which receives a plurality of pieces of identification information concerning a device of the other party by means of communication, the radio transmission/reception part 12, the baseband part 14 and the control part 16 are explained as an example. However, the pieces of identification information concerning a device of the other party are input from the input operation part 20 and so on and can also be received to the control part 16. Or, it is also possible to select the pieces of identification information concerning the device of the other party, which are displayed on the information presenting part 22, and to receive them. Because of this, the identification information reception part may also be constituted by the input operation part 20 and the control part 16, or by the input operation part 20, the control part 16 and the information presenting part 22.

(d) In the embodiments, the explanation is given on a case that a radio wave is utilized as a transmission medium of information. However, the present invention may also utilize a transmission medium except a radio wave, for example, a sonic wave and so on.

(e) In the embodiments, the explanation is given on a mobile terminal, an apparatus and so on of a mobile phone, PHS, PDA, a mobile PC and so on. However, the present invention can be applied to a radio communication terminal and various kinds of electronic devices to which the radio communication terminal is provided.

(f) In the embodiments, as data which should be stored in the data base part 18 as profile information, the following data and so on exist.

(i) A Bluetooth profile name.

(ii) A server channel number used for communication {a case of a profile using RFCOMM (RF Communications Protocol)}.

(iii) Some other attribute parameter (in case of a profile of the Object Push, what data format out of the vcard, the vMessage and so on is supported in transmission and reception ?, and so on).

By recording these in the data base part 18, another inquiry by the SDP becomes unnecessary in a connection from the second time, a connection process can be started based on the recorded information. For example, in case of a profile using the RFCOMM like the Object Push profile, although it is necessary that a sever channel number of the other party is specified in advance, communication with a device of the other party becomes possible by designating the channel number. After that communication, a final function can be attained by an application protocol such as OBEX (Object Exchange Protocol) and TCP/IP (Transmission Control Protocol/Internet Protocol). In the embodiments, in connection with the Bluetooth profile, the profile name is explained as information which is recorded in the database part 18, as an example. However, if the information of (ii) and (iii) mentioned above has been recorded, an inquiry of the above-mentioned information to a device of the other party by the SDP, which has been needed every communication, becomes unnecessary. In this case, a protocol for obtaining information necessary for a connection is the SDP.

Although the best mode for carrying out the invention, the object, the configuration and the operation and effect have been described in detail above, the invention is not limited to the above description of the embodiments, the examples of modification and so forth, and it is a matter of course that the invention can be variously changed or modified by a person skilled in the art on the basis of a gist and split of the invention as disclosed in claims and the detailed description of the invention, and such a change or modification, and various conjectured configurations, modified examples and so forth are included in the scope of the invention, and the description of the specification and drawings are not restrictively understood.

The entire disclosure of Japanese Patent Application No. 2002-341605 including specification, claims, drawings and summary are incorporated herein by reference in its entirety.

What is claimed is:

1. A communication device including a plurality of communication functions corresponding to communication functions for devices belonging to another party, and having a function which manages identification information concerning the devices of the other party, comprising:

a receiver receiving a plurality of pieces of identification information concerning the devices of the other party, said identification information including information to specify a communication interface for the devices of the other party, said devices of the other party including a device able to communicate and existing within a range for said communication device to communicate in case of performing communication by said communication device;

a storage storing the identification information; and an information processor executing operations of
> storing pieces of identification information concerning the devices of the other party in said storage,
> retrieving the identification information from said storage by receiving input of specifying information out of said pieces of identification information, and
> relating a result of that retrieval to said specifying information and outputting them, or making that output possible, in order to identify and specify a particular device of the other party, wherein the identification information including the specifying information is obtained in a process of existence confirmation of said devices of the other party preperformed before establishment of a connection between said communication device and said devices of the other party, the specifying information and the identification information are related to be stored to the storage, after relating said specifying information and said identification information, said connection with said devices of the other party is able to be started by designation of said specifying information, and said information processor further executes operations of
> storing profile information showing a connection procedure with said devices of the other party in said storage so that said profile information can be designated,
> retrieving from said storage by said identification information related to said designated specifying information to specify a device of the other party, and
> performing a connection with the specified device of the other party by said identification information related to said designated specifying information, said connection being performed by a procedure according to said profile information to be designated.

2. The communication device of claim 1, wherein said pieces of identification information include human information and one or plural pieces of proper information representative of the devices of the other party, and said specifying information to which said pieces of identification information are related is said human information.

3. The communication device of claim 1 further comprising an information presenter relating the result of the retrieval of said information processor to said specifying information and presenting them.

4. A communication device including a plurality of communication functions corresponding to communication functions for devices belonging to another party, and managing identification information concerning the devices of the other party, comprising:
> a transmitter/receiver demanding transmission of identification information from a particular device of the other party from among the devices of the other party, receiving a plurality of pieces of identification information concerning the device of the other party, said identification information including information to specify a communication interface of said device of the other party, said devices of the other party including a device able to communicate and existing within a range for said communication device to communicate in case of performing communication by said communication device;
> a storage storing the identification information; and
> an information processor storing the pieces of identification information received from the device of the other party in said storage, retrieving the identification information from said storage by receiving input of specifying information out of said pieces of identification information, and relating a result of that retrieval to said specifying information and outputting them, or making that output possible, in order to identify and specify the particular device of the other party wherein the identification information including the specifying information is obtained in a process of existence confirmation of said devices of the other party preperformed before establishment of a connection between said communication device and said devices of the other party, the specifying information and the identification information are related to be stored to the storage, after relating said specifying information and said identification information, said connection with said devices of the other party is able to be started by designation of said specifying information, and said information processor stores profile information showing a connection procedure with said devices of the other party in said storage so that said profile information can be designated, said information processor retrieving from said storage by said identification information related to said designated specifying information to specify a device of the other party, said information processor performing a connection with the specified device of the other party by said identification information related to said designated specifying information, said connection being performed by a procedure according to said profile information to be designated.

5. A communication device including a plurality of communication functions corresponding to communication functions for devices belonging to another party, and using proper address information which specifies an interface for the devices of the other party, comprising:
> a transmitter/receiver transmitting and receiving identification information specifying devices of the other party, said identification information including proper address information to specify a communication interface of said devices of the other party, said devices of the other party including a device able to communicate and existing within a range for said communication device to communicate in case of performing communication by said communication device;
> a storage storing the proper address information related to specifying information out of the identification information; and
> an information processor relating said proper address information to the specifying information out of the identification information received from the devices of the other party and storing said proper address information in the storage, wherein the identification information including the specifying information is obtained in a process of existence confirmation of said devices of the other party preperformed before establishment of a connection between said communication device and said devices of the other party, the specifying information and the proper address information are related to be stored to the storage, after relating said specifying information and said proper address information, said connection with said devices of the other party is able to be started by designation of said specifying information, and said information processor stores profile information showing a connection procedure with said devices of the other party in said storage so that said profile information can be designated, said information processor retrieving from said storage by said proper address information related to said designated specifying information to specify a device of the other party, said information processor performing a connection with the specified device of the other party by said proper address information related to said designated specifying information, said connection being performed by a procedure according to said profile information to be designated.

6. The communication device of claim 4 further comprising a presenter relating the pieces of identification information received from the devices of the other party to the specifying information and presenting them.

7. A communication device including a plurality of communication functions corresponding to communication functions for devices belonging to another party, and using proper address information which specifies an interface for the devices of the other party, comprising:
    a data base part that relates the proper address information which specifies a communication interface for the devices of the other party to specifying information in the proper address information and stores it, said devices of the other party having a communication standard corresponding to said communication device, and said devices of the other party including a device able to communicate and existing within a range for said communication device to communicate in case of performing communication by said communication device;
    an information presenting part that outputs the proper address information stored in said data base part;
    a selection input part that selects optional proper address information from a plurality of pieces of proper address information presented in said information presenting part; and
    an information processing part that retrieves said data base part by using a result of selection of the selection input part as a key, and starts a connection with a particular device of the other party by using the proper address information which is a result of that retrieval, wherein
    the proper address information including the specifying information is obtained in a process of existence confirmation of said devices of the other party preperformed before establishment of a connection between said communication device and said devices of the other party,
    said proper address information and said specifying information are related to be stored to said data base part,
    after relating said specifying information and said proper address information, said connection with said devices of the other party is able to be started by designation of said specifying information, and
    said information processing part further
        stores profile information showing a connection procedure with said devices of the other party in said data base part so that said profile information can be designated,
        retrieves from said data base part by said proper address information related to said designated specifying information to specify a device of the other party,
        connects with the specified device of the other party by said proper address information related to said designated specifying information, said connecting being performed by a procedure according to said profile information to be designated.

8. An information processing method of a communication device which performs communication with devices of another party, comprising:
    receiving a plurality of pieces of identification information concerning the devices of the other party, said identification information including information to specify a communication interface of said devices of the other party, said devices of the other party communicating with said communication device, said communication device having a plurality of communication functions corresponding to communication functions for devices belonging to the other party, said devices of the other party including a device able to communicate and existing within a range for said communication device to communicate in case of performing communication by said communication device;
    storing pieces of identification information, which are received, in a storage;
    storing profile information showing a connection procedure with said devices of the party in said storage so that said profile information can be designated;
    relating the identification information for specifying the communication interface of the devices of the other party by specifying information in the identification information; and
    retrieving the identification information from the storage by receiving input of the specifying information out of the pieces of identification information, and relating a result of that retrieval to said specifying information and outputting them, or making that output possible, in order to identify and specify a particular device of the other party, wherein
    the identification information including the specifying information is obtained in a process of existence confirmation of said devices of the other party preperformed before establishment of a connection between said communication device and said devices of the other party,
    said identification information and said specifying information are related to be stored to said storage,
    after relating said specifying information and said identification information, said connection with said devices of the other party is able to be started by designation of said specifying information,
    said identification information related to said designated specifying information is retrieved from said storage to specify a device of the other party, and a connection with the specified device of the other party is performed by said identification information related to said designated specifying information, and
    said connection is performed by a procedure according to said profile information to be designated.

9. An information processing method of a communication device which performs communication with devices of another party, comprising:
    demanding transmission of identification information from the devices of the other party, and receiving the identification information from the devices of the other party, said identification information including information to specify a communication interface of said devices of the other party, said devices of the other party communicating with said communication device, said communication device having a plurality of communication functions corresponding to communication functions for devices belonging to the other party, said devices of the other party including a device able to communicate and existing within a range for said communication device to communicate in case of performing communication by said communication device;
    storing a plurality of pieces of identification information, which are received, in a storage;
    storing profile information showing a connection procedure with said devices of the other party in said storage so that said profile information can be designated;
    relating the identification information for specifying the communication interface of the devices of the other party by specifying information in the identification information; and retrieving the identification information from the storage by receiving input of the specifying information out of the pieces of identification information, and relating a result of that retrieval to said specifying information and outputting them, or making that output possible, in order to identify and specify a particular device of the other party, wherein the identification information including the specifying information is obtained in a process of existence confirmation of said devices of the other party preperformed before establishment of a connection between said communication device and said devices of the other party, said identification information and said specifying information are related to be stored to said storage, after relating said specifying information and said identification information, said connection with said devices of the other party is able to be started by designation of said specifying information, said identification information related to said designated specifying information is retrieved from said storage to specify a device of the other party, and a connection with the specified device of the other party is performed by said identification information related to said designated specifying information, and said connection is performed by a procedure according to said profile information to be designated.

10. A computer readable recording medium storing a computer program for information processing of a communication device having a plurality of communication functions corresponding to communication functions for devices belonging to another party which performs communication with the devices of the other party, the program which when executed by a computer causes the computer to perform the process comprising:

receiving a plurality of pieces of identification information concerning the devices of the other party, said identification information including information to specify a communication interface of said devices of the other party, said devices of the other party including a device able to communicate and existing within a range for said communication device to communicate in case of performing communication by said communication device;

storing the pieces of identification information, which are received, in a storage;

storing profile information showing a connection procedure with said devices of the other party in said storage so that said profile information can be designated;

relating the identification information for specifying the communication interface of the devices of the other party by specifying information in the identification information; and retrieving the identification information from the storage by receiving input of the specifying information out of the pieces of identification information, and relates a result of that retrieval to said specifying information and outputs them, or makes that output possible, in order to identify and specify a particular device of the other party, wherein the identification information including the specifying information is obtained in a process of existence confirmation of said devices of the other party preperformed before establishment of a connection between said communication device and said devices of the other party, said identification information sand said specifying information are related to be stored to said storage, after relating said specifying information and said identification information, said connection with said devices of the other party is able to be started by designation of said specifying information, the process further comprising:

retrieving from said storage by said identification information related to said designated specifying information to specify a device of the other party;

connecting with the specified device of the other party by said identification information related to said designated specifying information, said connecting being performed by a procedure according to said profile information to be designated.

11. A computer readable recording medium storing a computer program for information processing of a communication device having a plurality of communication functions corresponding to communication functions for devices belonging to another party which performs communication with the devices of the other party, the program which when executed by a computer causes the computer to perform the process comprising:

demanding transmission of identification information to the devices of the other party, and receiving the identification information from the devices of the other party, said identification information including information to specify a communication interface of said devices of the other party, said devices of the other party including a device able to communicate and existing within a range for said communication device to be able to communicate in case of performing communication by said communication device;

storing a plurality of pieces of identification information, which are received, in a storage;

storing profile information showing a connection procedure with said devices of the other party in said storage so that said profile information can be designated;

relating the identification information for specifying the communication interface of the devices of the other party by specifying information in identification information; and retrieving the identification information from the storage by receiving input of the specifying information out of the pieces of identification information, and relates a result of that retrieval to said specifying information and outputs them, or makes that output possible, in order to identify and specify a particular device of the other party, wherein the identification information including the specifying information is obtained in a process of existence confirmation of said devices of the other party preperformed before establishment of a connection between said communication device and said devices of the other party, said identification information and said specifying information are related to be stored to said storage, after relating said specifying information and said identification information, said connection with said devices of the other party is able to be started by designation of said specifying information, the process further comprising:

retrieving from said storage by said identification information related to said designated specifying information to specify a device of the other party;

performing a connection with the specified device of the other party by said identification information related to said designated specifying information, said connection being performed by a procedure according to said profile information to be designated.

12. A communication device having a plurality of communication functions corresponding to communication functions for devices belonging to another party managing identification information concerning the devices of the other party, comprising:
- a receiver receiving a plurality of pieces of identification information concerning the devices of the other party, the plurality of pieces of identification information including information to specify a communication interface of said devices of the other party and name information of device assigned by a manufacturer or a user, said devices of the other party including a device able to communicate and existing within a range for said communication device to communicate in case of performing communication by said communication device;
- a storage storing the pieces of identification information; and
- an information processor storing the pieces of identification information concerning the devices of the other party in said storage, retrieving the identification information from said storage by receiving input of said name information out of said pieces of identification information, and relating a result of that retrieval to said name information and outputting them, or making that output possible, in order to identify and specify a particular device of the other party, wherein the identification information including the name information is obtained in a process of existence confirmation of said devices of the other party preperformed before establishment of a connection between said communication device and said devices of the other party, the name information and the identification information are related to be stored to the storage, after relating said name information and said identification information, said connection with said devices of the other party is able to be started by designation of said name information, and said information processor stores profile information showing a connection procedure with said devices of the other party in said storage so that said profile information can be designated, said information processor retrieving from said storage by said identification information related to said designated name information to specify a device of the other party, said information processor performing a connection with the specified device of the other party by said identification information related to said designated name information, said connection being performed by a procedure according to said profile information to be designated.

13. A communication device having a plurality of communication functions corresponding to communication functions for devices belonging to another party which manages identification information concerning the devices of the other party, comprising:
- a storage storing identification information of the devices of the other party and a corresponding device name of the devices of the other party, said identification information including information to specify a communication interface of said devices of the other party, the device name information being assigned by a manufacturer or a user, said devices of the other party including a device able to communicate and existing within a range for said communication device to communicate in case of performing communication by said communication device; and
- an information processor retrieving the identification information from said storage responding to said name information that specifies a part of said identification information, and using the retrieved identification information for operational processing, wherein the identification information including the name information is obtained in a process of existence confirmation of said devices of the other party preperformed before establishment of a connection between said communication device and said devices of the other party, the name information and the identification information are related to be stored to the storage, after relating said name information and said identification information, said connection with said devices of the other party is able to be started by designation of said name information, and said information processor stores profile information showing a connection procedure with said devices of the other party in said storage so that said profile information can be designated, said information processor retrieving from said storage by said identification information related to said designated name information to specify a device of the other party, said information processor performing a connection with the specified device of the other party by said identification information related to said designated name information, said connection being performed by a procedure according to said profile information to be designated.

* * * * *

UNITED STATES PATENT AND TRADEMARK OFFICE
CERTIFICATE OF CORRECTION

PATENT NO. : 7,756,474 B2
APPLICATION NO. : 10/694989
DATED : July 13, 2010
INVENTOR(S) : Hideaki Watanabe et al.

Page 1 of 1

It is certified that error appears in the above-identified patent and that said Letters Patent is hereby corrected as shown below:

Column 25, Line 66 delete "sand" and insert -- and --, therefor.

Signed and Sealed this

Second Day of November, 2010

David J. Kappos
*Director of the United States Patent and Trademark Office*